US012606314B2

(12) United States Patent
Detweiler et al.

(10) Patent No.: US 12,606,314 B2
(45) Date of Patent: Apr. 21, 2026

(54) CONTROLLING HYBRID-ELECTRIC OR ALL-ELECTRIC POWERTRAINS AND PROPULSION SYSTEMS

(71) Applicants: General Electric Company, Schenectady, NY (US); GE Avio S.r.l., Rivalta di Torino (IT)

(72) Inventors: Gregory L. Detweiler, Cincinnati, OH (US); Stefano Ettorre, Bari (IT); Thomas William Brown, Cincinnati, OH (US)

(73) Assignees: General Electric Company, Schenectady, NY (US); GE Avio S.r.l., Rivalta di Torino (IT)

( * ) Notice: Subject to any disclaimer, the term of this patent is extended or adjusted under 35 U.S.C. 154(b) by 115 days.

(21) Appl. No.: 18/153,395

(22) Filed: Jan. 12, 2023

(65) Prior Publication Data

US 2024/0034479 A1 Feb. 1, 2024

(30) Foreign Application Priority Data

Jul. 29, 2022 (IT) ........................ 102022000016215

(51) Int. Cl.
B64D 31/06 (2024.01)
B60K 6/44 (2007.10)
(Continued)

(52) U.S. Cl.
CPC ................ B64D 31/06 (2013.01); B60K 6/44 (2013.01); B60K 6/46 (2013.01); B60K 6/48 (2013.01);
(Continued)

(58) Field of Classification Search
CPC ........ B64D 27/02; B64D 27/30; B64D 27/32; B64D 27/34; B64D 27/35; B64D 27/351;
(Continued)

(56) References Cited

U.S. PATENT DOCUMENTS

| | | | |
|---|---|---|---|
| 4,729,086 A | 3/1988 | Lethellier | |
| 5,043,595 A | 8/1991 | Sugiyama | |
| (Continued) | | | |

FOREIGN PATENT DOCUMENTS

CN 114104303 A 3/2022

OTHER PUBLICATIONS

Office Action and Search Report received for Chinese Application No. 202310937965.2, mailed on Jan. 27, 2026, 14 pages (7 pages of original office action and 7 pages of English Translation).

*Primary Examiner* — Jason H Duger
(74) *Attorney, Agent, or Firm* — Smith, Gambrell & Russell, LLP

(57) ABSTRACT

A hybrid-electric or all-electric powertrain may include a power control unit electrically coupled to an energy storage system. The power control unit may determine a power level command based at least in part on a power level request for the powertrain, and a power level-UCL and/or a power level-LCL. The power level-UCL and/or the power level-LCL may be based at least in part on an aggregate obverse power level request representing a requested power level for one or more obverse powertrains electrically coupled to the energy storage system. The power level commands may be limited by the power level-UCL and/or the power level-LCL. The power level-UCL may be set equal to either an available discharge power capacity or an apportionate discharge power capacity. The power level-LCL may be set equal to either an available storage power capacity or an apportionate storage power capacity.

20 Claims, 15 Drawing Sheets

(51) Int. Cl.

| | |
|---|---|
| *B60K 6/46* | (2007.10) |
| *B60K 6/48* | (2007.10) |
| *B60L 15/20* | (2006.01) |
| *B60L 50/61* | (2019.01) |
| *B60L 58/12* | (2019.01) |
| *B60L 58/13* | (2019.01) |
| *B60L 58/14* | (2019.01) |
| *B60L 58/15* | (2019.01) |
| *B60L 58/16* | (2019.01) |
| *B60W 10/06* | (2006.01) |
| *B60W 10/08* | (2006.01) |
| *B60W 10/26* | (2006.01) |
| *B60W 10/30* | (2006.01) |
| *B60W 20/11* | (2016.01) |
| *B60W 20/13* | (2016.01) |
| *B60W 30/188* | (2012.01) |
| *B64D 27/02* | (2006.01) |
| *B64D 27/24* | (2024.01) |
| *B64D 27/30* | (2024.01) |
| *B64D 27/31* | (2024.01) |
| *B64D 27/32* | (2024.01) |
| *B64D 27/33* | (2024.01) |
| *B64D 27/34* | (2024.01) |
| *B64D 27/35* | (2024.01) |
| *B64D 27/351* | (2024.01) |
| *B64D 27/355* | (2024.01) |
| *B64D 27/357* | (2024.01) |
| *B64D 31/18* | (2024.01) |
| *B60K 6/32* | (2007.10) |
| *B60K 6/445* | (2007.10) |
| *B60W 10/28* | (2006.01) |

(52) U.S. Cl.
CPC ............... *B60L 15/20* (2013.01); *B60L 50/61* (2019.02); *B60L 58/12* (2019.02); *B60L 58/13* (2019.02); *B60L 58/14* (2019.02); *B60L 58/15* (2019.02); *B60L 58/16* (2019.02); *B60W 10/06* (2013.01); *B60W 10/08* (2013.01); *B60W 10/26* (2013.01); *B60W 10/30* (2013.01); *B60W 20/11* (2016.01); *B60W 20/13* (2016.01); *B60W 30/1886* (2013.01); *B64D 27/02* (2013.01); *B64D 27/24* (2013.01); *B64D 27/30* (2024.01); *B64D 27/31* (2024.01); *B64D 27/32* (2024.01); *B64D 27/33* (2024.01); *B64D 27/34* (2024.01); *B64D 27/35* (2024.01); *B64D 27/351* (2024.01); *B64D 27/355* (2024.01); *B64D 27/357* (2024.01); *B64D 31/18* (2024.01); *B60K 6/32* (2013.01); *B60K 6/445* (2013.01); *B60L 2200/10* (2013.01); *B60L 2220/42* (2013.01); *B60W 10/28* (2013.01); *B60W 2510/244* (2013.01); *B60W 2510/28* (2013.01); *B60W 2510/305* (2013.01); *B60W 2710/083* (2013.01); *B64D 27/026* (2024.01); *B64D 2221/00* (2013.01)

(58) Field of Classification Search
CPC .... B64D 27/355; B64D 27/357; B64D 31/12; B64D 31/16; B60L 58/10–16; B60L 15/2045
See application file for complete search history.

(56) References Cited

U.S. PATENT DOCUMENTS

| | | | | |
|---|---|---|---|---|
| 5,128,602 | A | 7/1992 | Carter, Jr. | |
| 6,474,068 | B1* | 11/2002 | Abdel Jalil | B60L 50/61 180/65.265 |
| 7,825,536 | B2 | 11/2010 | Jacobson et al. | |
| 8,447,441 | B2* | 5/2013 | Calvignac | G06F 7/00 700/286 |
| 9,170,641 | B2 | 10/2015 | Huang | |
| 11,133,763 | B1 | 9/2021 | Islam | |
| 11,390,168 | B1* | 7/2022 | Bryan | B60L 15/2045 |
| 11,852,084 | B2* | 12/2023 | Gomez | B64D 31/18 |
| 2013/0184958 | A1* | 7/2013 | Dyrla | G05D 1/0005 701/99 |
| 2016/0052505 | A1 | 2/2016 | Zhou | |
| 2017/0292523 | A1* | 10/2017 | Niergarth | F02K 5/00 |
| 2018/0251228 | A1* | 9/2018 | Sands | B64D 31/18 |
| 2018/0346139 | A1* | 12/2018 | Ferran | B64D 31/06 |
| 2020/0031480 | A1 | 1/2020 | Baig et al. | |
| 2020/0277063 | A1 | 9/2020 | Thomassin et al. | |
| 2021/0367534 | A1 | 11/2021 | Hogan et al. | |
| 2022/0017064 | A1* | 1/2022 | Dougherty | H02J 7/1423 |
| 2022/0063819 | A1 | 3/2022 | Murrow et al. | |
| 2022/0169375 | A1 | 6/2022 | Oullet et al. | |
| 2022/0169378 | A1 | 6/2022 | Kuang et al. | |
| 2022/0204172 | A1* | 6/2022 | Cho | B64D 27/357 |
| 2022/0234748 | A1* | 7/2022 | Mark | B64D 27/02 |
| 2023/0006453 | A1* | 1/2023 | Okada | H02J 7/0031 |

* cited by examiner

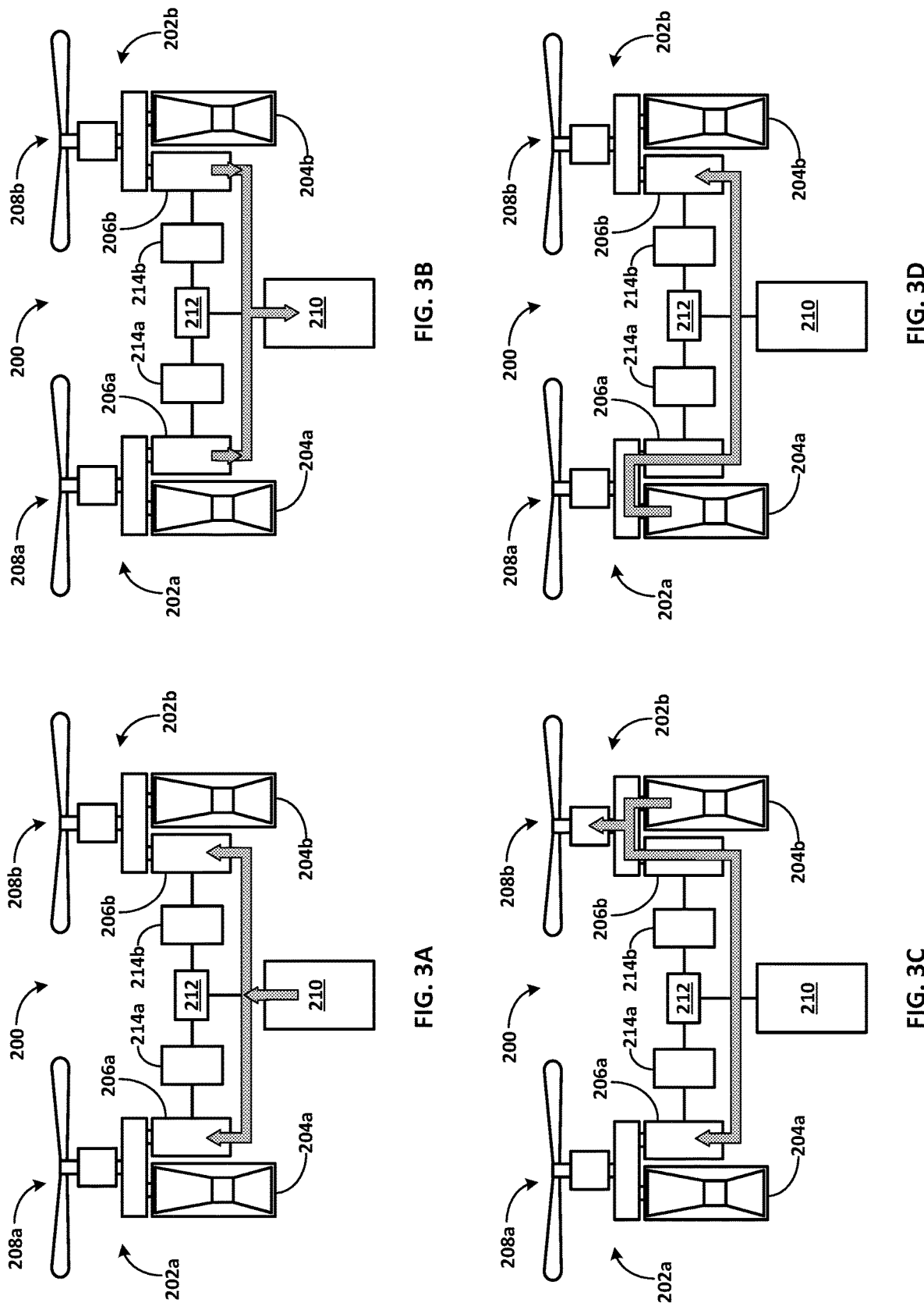

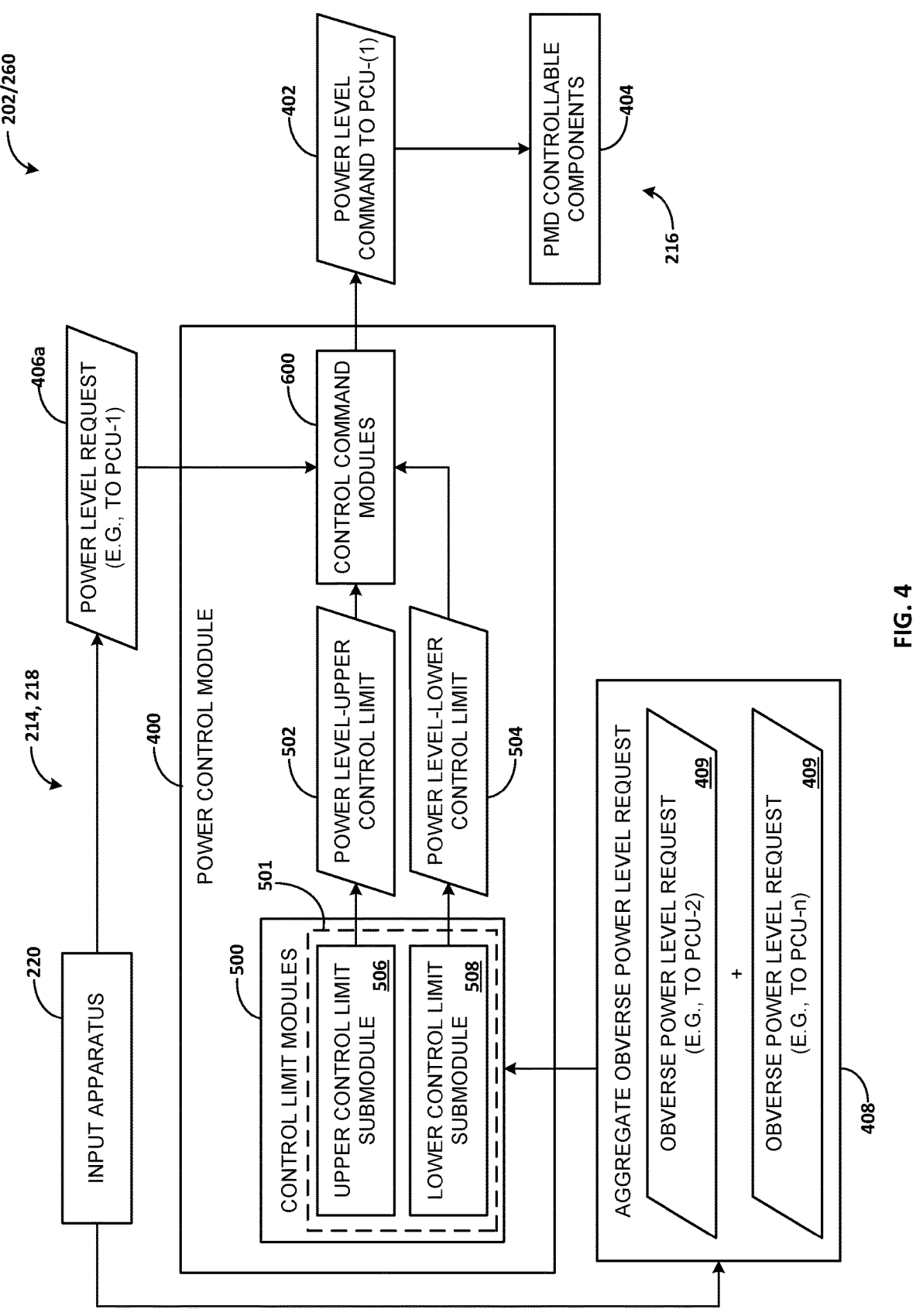

202/260

POWER LEVEL COMMAND TO PCU-(1)    402

PMD CONTROLLABLE COMPONENTS    404

216

406a

POWER LEVEL REQUEST (E.G., TO PCU-1)

214, 218

400

POWER CONTROL MODULE

600

CONTROL COMMAND MODULES

502

POWER LEVEL–UPPER CONTROL LIMIT

504

POWER LEVEL–LOWER CONTROL LIMIT

220

INPUT APPARATUS

501

500

CONTROL LIMIT MODULES

UPPER CONTROL LIMIT SUBMODULE    506

LOWER CONTROL LIMIT SUBMODULE    508

AGGREGATE OBVERSE POWER LEVEL REQUEST

OBVERSE POWER LEVEL REQUEST (E.G., TO PCU-2)    409

+

OBVERSE POWER LEVEL REQUEST (E.G., TO PCU-n)    409

LIMITING THE POWER LEVEL COMMAND BY THE POWER LEVEL-UPPER CONTROL LIMIT AND/OR THE POWER LEVEL-LOWER CONTROL LIMIT

SETTING THE POWER LEVEL COMMAND EQUAL TO THE POWER LEVEL REQUEST WHEN THE POWER LEVEL REQUEST IS BETWEEN THE POWER LEVEL-UPPER CONTROL LIMIT AND A POWER LEVEL-LOWER CONTROL LIMIT     828

SETTING THE POWER LEVEL COMMAND EQUAL TO THE POWER LEVEL-UPPER CONTROL LIMIT WHEN A POWER LEVEL REQUEST FOR THE HYBRID-ELECTRIC POWERTRAIN IS GREATER THAN THE POWER LEVEL-UPPER CONTROL LIMIT     830

SETTING THE POWER LEVEL COMMAND EQUAL TO THE POWER LEVEL-LOWER CONTROL LIMIT WHEN THE POWER LEVEL REQUEST IS LESS THAN THE POWER LEVEL-LOWER CONTROL LIMIT  832

FIG. 8D

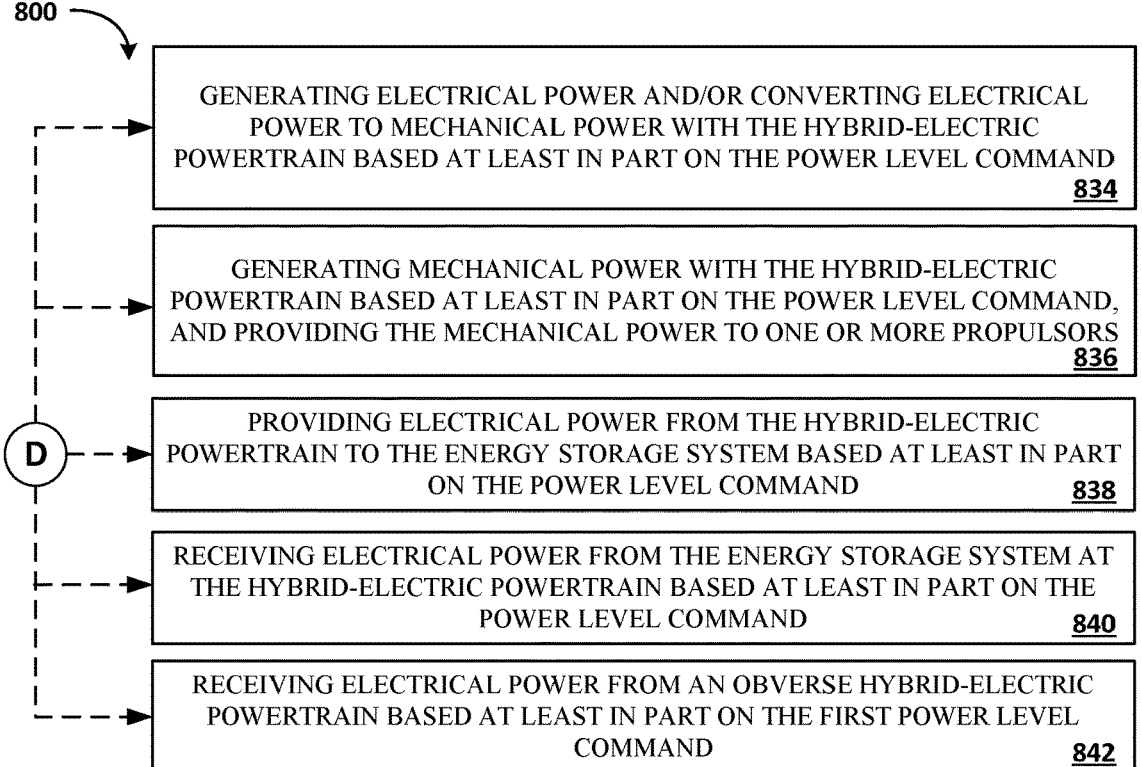

800

GENERATING ELECTRICAL POWER AND/OR CONVERTING ELECTRICAL POWER TO MECHANICAL POWER WITH THE HYBRID-ELECTRIC POWERTRAIN BASED AT LEAST IN PART ON THE POWER LEVEL COMMAND     834

GENERATING MECHANICAL POWER WITH THE HYBRID-ELECTRIC POWERTRAIN BASED AT LEAST IN PART ON THE POWER LEVEL COMMAND, AND PROVIDING THE MECHANICAL POWER TO ONE OR MORE PROPULSORS     836

PROVIDING ELECTRICAL POWER FROM THE HYBRID-ELECTRIC POWERTRAIN TO THE ENERGY STORAGE SYSTEM BASED AT LEAST IN PART ON THE POWER LEVEL COMMAND     838

RECEIVING ELECTRICAL POWER FROM THE ENERGY STORAGE SYSTEM AT THE HYBRID-ELECTRIC POWERTRAIN BASED AT LEAST IN PART ON THE POWER LEVEL COMMAND     840

RECEIVING ELECTRICAL POWER FROM AN OBVERSE HYBRID-ELECTRIC POWERTRAIN BASED AT LEAST IN PART ON THE FIRST POWER LEVEL COMMAND     842

CONTROLLING HYBRID-ELECTRIC OR ALL-ELECTRIC POWERTRAINS AND PROPULSION SYSTEMS

PRIORITY INFORMATION

The present application claims priority to Italian Patent Application Number 102022000016215 filed on Jul. 29, 2022.

FIELD

The present disclosure relates generally to systems and methods for controlling hybrid-electric or all-electric powertrains and propulsion systems for vehicles such as aircraft.

BACKGROUND

Aircraft and other vehicles may utilize a hybrid-electric or all-electric propulsion system that includes a plurality of hybrid-electric or all-electric powertrains. Hybrid-electric or all-electric propulsion systems may provide improved fuel efficiency and reduced emissions, as well as reduced operating costs. Accordingly, it would be welcomed in the art to provide improved hybrid-electric and all-electric powertrains and propulsion systems, as well as improved systems and methods of controlling such powertrains and propulsion systems.

BRIEF DESCRIPTION OF THE DRAWINGS

A full and enabling disclosure, including the best mode thereof, directed to one of ordinary skill in the art, is set forth in the specification, which makes reference to the appended figures, in which:

FIGS. 3A-3D schematically depict exemplary operating states of an exemplary hybrid-electric or all-electric propulsion system;

FIG. 4 schematically depicts features an exemplary power control module for a hybrid-electric or all-electric powertrain;

FIGS. 8A-8E show a flow chart depicting an exemplary method of controlling a hybrid-electric or all-electric propulsion system or powertrain.

DETAILED DESCRIPTION

Figure 1:
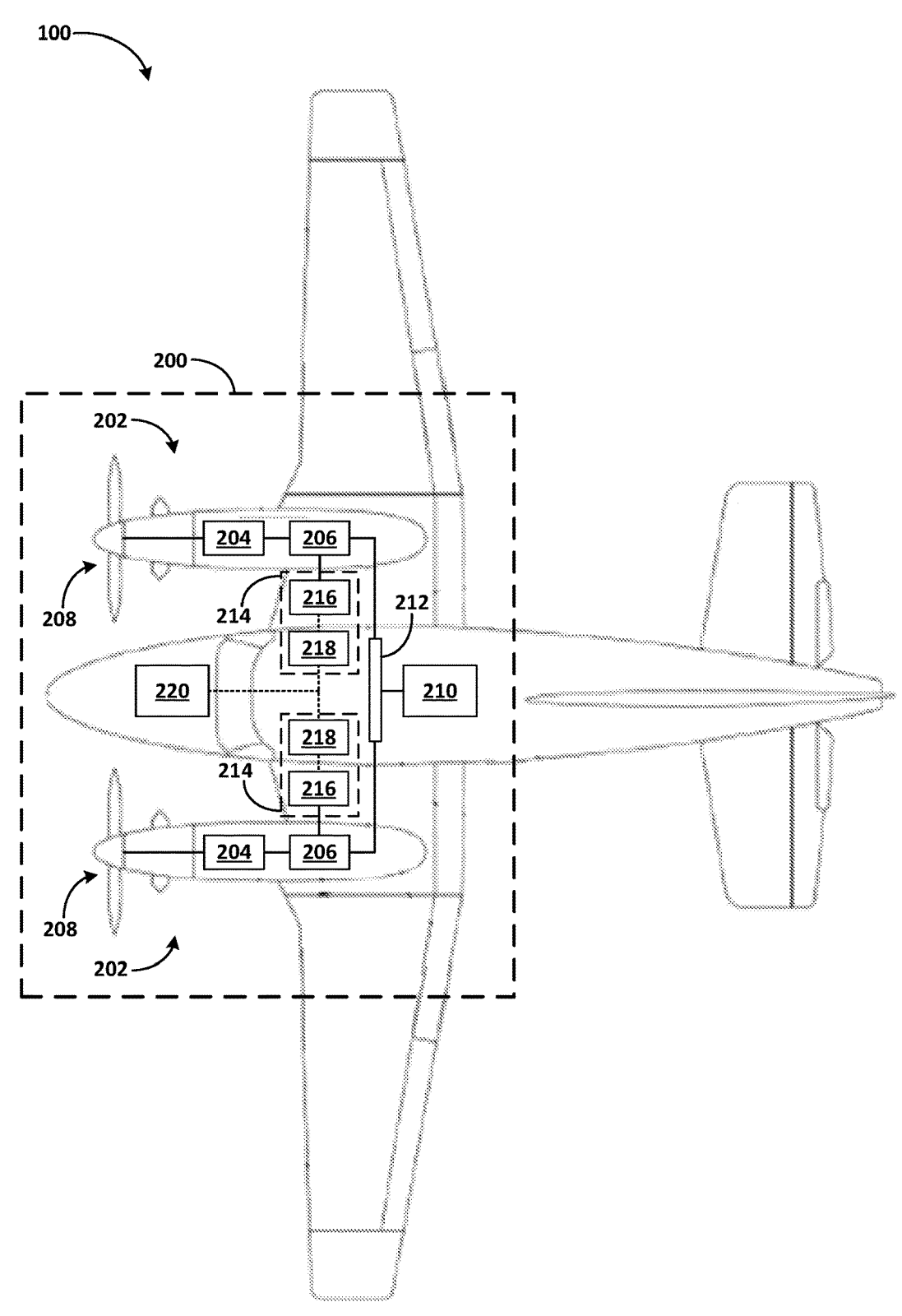
FIG. 1 shows a schematic cross-sectional view of an exemplary aircraft that includes a hybrid-electric propulsion system.

Reference will now be made in detail to embodiments of the present disclosure, one or more examples of which are illustrated in the accompanying figures. The embodiments illustrated in the figures and described in the specification are provided by way of example and not to limit the present disclosure.

The present disclosure uses numerical and letter designations to refer to features in the figures. Like or similar designations in the drawings and description have been used to refer to like or similar parts of the disclosure. Letter designations (e.g., "a," "b," etc.) following a numerical designation respectively refer to a sequential instance of the element identified by the numerical designation, while otherwise referring to the same or similar element identified by the numerical designation without such a letter designation.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a," "an," and "the" include plural references unless the context clearly dictates otherwise.

The term "at least one of" in the context of, e.g., "at least one of A, B, or C" refers to only A, only B, only C, or any combination of A, B, and C.

As used herein, the terms "first," "second," and "third" may be used interchangeably to distinguish one component from another and are not intended to signify location or importance of the individual components.

The term "rated speed," as used herein with reference to a powertrain or propulsion system, or with reference to a combustion engine (e.g., a gas turbine engine), or with reference to an electric machine, refers to a maximum rotational speed that may be achieved while operating properly. For example, the rated speed may be realized during maximum load operations, such as during takeoff or climbing operations.

The term "cruising speed," as used herein with reference to a powertrain or propulsion system, or with reference to a combustion engine (e.g., a gas turbine engine), or with reference to an electric machine, refers to refers to operation thereof at a relatively high rotational speed for a sustained period of time. For example, a cruising speed realized when on aircraft levels after climbing to a specified altitude. In some embodiments, a cruising speed may be from 50% to 90% of the rated speed, such as from 70% to 80% of the rated speed. In some embodiments, a cruising speed may be realized at 80% of full throttle, such as from 50% to 90% of full throttle, such as from 70% to 80% full throttle.

The term "nominal operating speed," as used herein with reference to a powertrain or propulsion system, or with reference to a combustion engine (e.g., a gas turbine engine), or with reference to an electric machine, refers to operation at a rotational speed that is greater than an idle speed and less than a rated speed. For example, nominal operating speed may include an operating speed that is at least 10% greater than an idle speed and at least 10% less than the rated speed. As an example, a nominal operating speed may include operating at a cruising speed.

The term "high-power operating speed," as used herein with reference to a powertrain or propulsion system, or with reference to a combustion engine (e.g., a gas turbine engine), or with reference to an electric machine, refers to operation at a rotational speed that is at least 90% of a rated speed for the engine The term "low-power operating speed," as used herein with reference to a powertrain or propulsion system, or with reference to a combustion engine (e.g., a gas turbine engine), or with reference to an electric machine, refers to operation at an idle rotational speed or at a rotational speed that is less than 10% greater than the idle speed.

The terms "coupled," "fixed," "attached to," and the like refer to both direct coupling, fixing, or attaching, as well as indirect coupling, fixing, or attaching through one or more intermediate elements or features, unless otherwise specified herein.

The term "electrically coupled," as used herein with reference to a plurality of elements, refers to elements that are configured to transfer electrical power therebetween, through one or more intermediate elements or features, and/or including by actuation of an electrical switch or other power management elements or features.

The present disclosure generally provides hybrid-electric and all-electric propulsion systems and powertrains, as well as systems and methods for controlling such propulsion systems and powertrains. The presently disclosed propulsion systems may include a plurality of powertrains that respectively include one or more electric machines and a power control unit. A respective powertrain may include one or more electric machines that convert electrical power to mechanical power, for example, to rotate one or more propulsors. Additionally, or in the alternative, the one or more electric machines may generate electrical power that may be supplied to an energy storage system and/or to another powertrain included in the propulsion system. For a hybrid-electric propulsion system or powertrain, a respective powertrain may include a combustion engine, such as a gas turbine engine. The combustion engine may generate mechanical power that may be used to rotate the one or more propulsors and/or to generate electrical power by way of the one or more electric machines. The respective powertrains may be electrically coupled to one another and/or to the energy storage system, for example, by way of a distribution bus. The respective powertrains may utilize the energy storage system as a shared resource, including as a supply of electrical power such as for rotating the one or more propulsors in the powertrain and/or for storing electrical power generated by the powertrain. Additionally, or in the alternative, the respective powertrains may respectively supply electrical power to another powertrain included in the propulsion system and/or may receive electrical power from such another powertrain.

One or more of respective powertrains may include a power control unit that independently controls at least a portion of the operations of the respective powertrain, for example, without relying on a supervisory control system and without relying on communication between the respective power control units and/or electronic controllers. The power control unit of a respective powertrain may include an electronic controller and one or more power management devices that operate according to control commands from the electronic controller. The power control unit may include one or more control modules configured to determine power level commands for the powertrain and to provide the power level commands to the power management devices. The one or more control modules may allow the power control unit and/or the electronic controller to independently control the respective operation of the powertrain, including, for example, in accordance with constraints limitations of the overall propulsion system that may change from time to time.

The one or more control modules of a respective power control unit may determine the power level commands based at least in part on a power level request for the corresponding powertrain. The power level commands may be limited by a power level-upper control limit (power level-UCL) and/or a power level-lower control limit (power level-LCL). The power level-UCL and/or the power level-LCL may be determined based on an aggregate obverse power level request representing a sum of one or more obverse power level requests. The one or more obverse power level requests respectively represent a power level request to another one of the powertrains in the propulsion system. By limiting the power level commands of a respective powertrain by the power level-UCL and/or the power level-LCL determined based on the aggregate obverse power level request, the respective powertrain can be independently controlled in accordance with constraints limitations of the overall propulsion system and without relying on a supervisory control system and without relying on communication between the respective power control units and/or electronic controllers. For example, when a power level request for the powertrain is between the power level-UCL and the power level-LCL, a power level command corresponding to the power level request may be provided to the powertrain, such as to the one or more power management devices. Additionally, or in the alternative, when a power level request for the powertrain is greater than the power level-UCL determined based on the aggregate obverse power level request, the power level command may be set to correspond to the power level-UCL; and/or when a power level request for the powertrain is less than the power level-LCL determined based on the aggregate obverse power level request, the power level command may be set to correspond to the lower level-LCL. In this way, the power level commands for a respective powertrain may remain within constraints limitations of the overall propulsion system.

The power level-UCL may be determined based at least in part on the larger of an available discharge power capacity and an apportionate discharge power capacity. The available discharge power capacity may include or represent a difference resulting from subtracting (i) the aggregate obverse power level request from (ii) a power discharge threshold that includes or represents a threshold level for discharging electrical power from the energy storage system. The apportionate discharge power capacity may include or represent an apportionment of the power discharge threshold to the powertrain. By determining the power level-UCL based at least in part on the larger of the available discharge power capacity and the apportionate discharge power capacity, the powertrain can be assured to have access to its respective apportionment of the power discharge threshold, while also having access to more than the apportionment of the power discharge threshold when the aggregate obverse power level request is such that the available portion of the power discharge threshold is greater than the apportionate discharge power capacity, for example, because the obverse power level request amount, in aggregate, is less than the apportionment of the power discharge threshold to those obverse powertrains, and/or because one or more of the obverse powertrains are generating and/or supplying electrical power to the propulsion system.

The power level-LCL may be determined based at least in part on the smaller of an available storage power capacity and an apportionate storage power capacity. The available storage power capacity may include or represent a difference resulting from subtracting (i) the aggregate obverse power level request from (ii) a charging threshold that includes or represents a threshold level for supplying electrical power to the energy storage system. The apportionate storage power capacity may include or represent an apportionment of the charging threshold to the powertrain. By determining the power level-UCL based at least in part on the smaller of the available storage power capacity and the apportionate discharge power capacity, the powertrain can be assured to have access to its respective apportionment of the charging threshold, while also having access to more than the apportionment of the charging threshold when the aggregate obverse power level request is such that the available portion of the charging threshold is greater than the apportionate storage power capacity, for example, because the obverse power level request amount, in aggregate, is less than the apportionment of the charging threshold to those obverse powertrains, and/or because one or more of the obverse powertrains are consuming electrical power from the propulsion system.

In some embodiments, a powertrain may receive electrical power from the energy storage system at a given time that exceeds the respective apportionment of the power discharge threshold, for example, by utilizing an unused portion of the power discharge threshold that is otherwise apportioned to the obverse powertrains in the propulsion system. Additionally, or in the alternative, a powertrain may receive electrical power from the distribution bus at a given time that exceeded the power discharge threshold of the energy storage system, for example, by utilizing electrical power supplied to the distribution bus by one or more of the obverse powertrains.

In some embodiments, a powertrain may supply electrical power to the energy storage system at a given time that exceeds the respective apportionment of the charging threshold, for example, by utilizing an unused portion of the charging threshold that is otherwise apportioned to the obverse powertrains in the propulsion system. Additionally, or in the alternative, in some embodiments, a powertrain may supply electrical power to the distribution bus at a given time that exceeded the charging threshold of the energy storage system, for example, by supplying electrical power to the distribution bus that may be utilized by one or more of the obverse powertrains.

By determining the power level-UCL and power level-LCL in accordance with the present disclosure, power level requests that are closer to zero will inherently have priority over power level requests that are closer to and/or in excess of the corresponding power level-UCL or power level-LCL. In this way, the power level commands to the respective powertrains inherently balance loads, at least partially, between the respective powertrains. For example, by determining the power level-UCL for the respective powertrains based on the larger of the available discharge power capacity and the apportionate discharge power capacity, a powertrain that has a power level request closer to zero will receive a corresponding power level command with inherent priority over an obverse power level request for an obverse powertrain that is closer to, or that exceeds, the power level-UCL. Additionally, or in the alternative, by determining the power level-LCL for the respective powertrains based on the smaller of the available storage power capacity and the apportionate storage power capacity, a powertrain that has a power level request closer to zero will receive a corresponding power level command with inherent priority over an obverse power level request for an obverse powertrain that is closer to, or that exceeds, the power level-LCL.

The present disclosure may provide more efficient energy utilization across a hybrid-electric or all-electric propulsion system, including, for example, more efficient allocation of power discharge capacity and/or charging capacity across respective powertrains in the propulsion system. The more efficient energy utilization may translate to improved operational range and/or fuel efficiency of an aircraft or other vehicle powered by the propulsion system. Additionally, or in the alternative, the present disclosure may provide for improvements in the way of lower emissions and/or lower operating costs.

The present disclosure may provide for improved scalability for hybrid-electric or all-electric propulsion systems that include a large number of powertrains. For example, the presently disclosed systems and methods of controlling a propulsion system or powertrain may be utilized to control a respective powertrain in a propulsion system that includes any desirable number of obverse powertrains. Additionally, or in the alternative, obverse powertrains may be added or subtracted, and/or transitioned from being online to offline (e.g., from an operational state to a non-operating state), without requiring changes to the presently disclosed systems and methods to accommodate the different number of obverse powertrains.

Exemplary embodiments of the present disclosure will now be described in further detail. Referring to FIG. 1, embodiments of the presently disclosed hybrid-electric propulsion systems may be incorporated into any desired vehicle, such as an aircraft 100. Additionally, or in the alternative, systems and/or methods of controlling a hybrid-electric propulsion system may be incorporated into any such desired vehicle, including the aircraft 100. The aircraft 100 depicted in FIG. 1 may be any type of aircraft that includes a multi-engine hybrid-electric propulsion system, including any fixed wing aircraft, such as a turbojet aircraft or a turboprop aircraft, or any rotorcraft, such as helicopter, that includes a multi-engine hybrid-electric propulsion system. By way of example, the aircraft 100 may be a multi-engine land class aircraft, a multi-engine sea class aircraft, etc.

As shown, the aircraft 100 includes a hybrid-electric propulsion system 200. The hybrid-electric propulsion system 200 may include a plurality of hybrid-electric powertrains 202. An exemplary hybrid-electric propulsion system 200 may include any number of hybrid-electric powertrains 202. In the embodiment shown in FIG. 1, the hybrid-electric propulsion system 200 includes two hybrid-electric powertrains 202. In further embodiments, a hybrid-electric propulsion system 200 may include n-number of hybrid-electric powertrain 202. For example, a hybrid-electric propulsion system 200 may include n-number of hybrid-electric powertrains 202, where the number, n, is from 2 to 20, such as from 2 to 6, such as from 6 to 12, or such as from 12 to 18. Respective ones of the plurality of hybrid-electric powertrains 202 may include a combustion engine 204 and electric machine 206. As shown in FIG. 1, respective ones of the plurality of hybrid-electric powertrains 202 may have a wing-mounted configuration. Additionally, or in the alternative, one or more of the hybrid-electric powertrains 202 may be mounted in any other suitable location of the aircraft 100.

The combustion engine 204 may be a gas turbine engine, such as a turbojet, a turbofan, a turboprop, a propfan, or a turboshaft. In some embodiments, the combustion engine 204 may be a reverse-flow turboprop gas turbine engine. For example, the aircraft 100 may be a fixed-wing aircraft that includes a plurality of hybrid-electric powertrains 202 that respectively include a combustion engine 204 configured as a reverse-flow turboprop gas turbine engine. In some embodiments, the combustion engine 204 may be a turboshaft gas turbine engine. For example, the aircraft 100 may be a rotorcraft that includes a plurality of hybrid-electric powertrains 202 that respectively include a combustion engine 204 configured as a turboshaft gas turbine engine. The electric machine 206 may be or include an electric motor and/or a generator. The combustion engine 204 and the electric machine 206 may provide torque to one or more propulsors 208. The one or more propulsors 208 may rotate under torque provided by the combustion engine 204 and/or the electric machine 206, providing propulsive thrust to power the aircraft 100.

The electric machine 206 may include any suitable induction machine, reluctance machine, and/or permanent magnet (PM) machine. In some embodiments, a hybrid-electric powertrain 202 may include an electric machine 206 configured as a motor/generator. Additionally, or in the alternative, a hybrid-electric powertrain 202 may include a plurality of electric machine 206, such as a first electric machine 206 configured as a motor and a second electric machine 206 configured as a generator. By way of example, an exemplary electric machine 206 may be or include an induction machine (IM), a switched reluctance machine (SRM), a wound rotor synchronous machine (WRSM), a permanent magnet synchronous machine (PMSM), a slotless PMSM, a PM-assisted synchronous reluctance machine (PM-assisted SynRM), a brushless DC (BLDC) machine, brushless doubly-fed reluctance machine (BDFRM), or the like.

Exemplary hybrid-electric powertrains 202 may provide a total propulsive power of from 0.5 Megawatts (MW) to 60 MW, such as from 0.5 MW to 3.0 MW, such as from 2.0 MW to 5.0 MW, such as from 5.0 MW to 25.0 MW, such as from 25 MW to 60 MW. The total propulsive power output of a hybrid-electric powertrain 202 may be allocated between the combustion engine 204 in the electric machine 206 in any desired proportion ranging from 0% to 100%, including, for example in varying proportions during different periods of operation, such as during different phases of flight. Exemplary electric machines 206 included in a hybrid-electric powertrain 202 may provide an electrical power output of from 50 kilowatts (kW) to 30 MW, such as from 50 kW to 500 kW, such as from 500 kW to 1 MW, such as from 1 MW to 5 MW, such as from 5 MW to 12 MW, such as from 12 MW to 20 MW, or such as from 20 MW to 30 MW.

As shown in FIG. 1, the one or more propulsors 208 may be or include a propeller assembly. Additionally, or in the alternative, the one or more propulsors 208 may include a ducted or inducted fan assembly. For example, a gas turbine engine may be a propfan (sometimes referred to as an open rotor engine or an ultra-high-bypass turbofan) may include one or more propulsors 208 configured as an unducted fan assembly. As another example, a gas turbine engine configured as a turbofan may include one or more propulsors 208 configured as a ducted fan assembly.

The hybrid-electric propulsion system 200 may include an energy storage system 210. The energy storage system may be a shared resource for the plurality of hybrid-electric powertrains 202. The energy storage system 210 may include one or more energy storage units, such as one or more batteries or the like. The energy storage system 210 may supply power to respective ones of the plurality of hybrid-electric powertrains 202 and/or to receive and store power from respective ones of the plurality of hybrid-electric powertrains 202. In some embodiments, the hybrid-electric propulsion system 200 may include a distribution bus 212 configured to supply power to respective ones of the plurality of hybrid-electric powertrains 202 and/or to receive and store power from respective ones of the plurality of hybrid-electric powertrains 202. The distribution bus 212 may distribute power at a suitable voltage for operation of the hybrid-electric powertrains 202 and the energy storage system 210. Distribution bus 212 may distribute electrical power in the form of direct current (DC) using any suitable power distribution regime, including, for example, one or more distribution loops, branches, pass filters, relays, switches, converters (e.g., DC/DC converters), devices operable to control the flow of electrical current, and so forth.

The energy storage system 210 may include any one or more devices configured for energy storage and/or generation. For example, the energy storage system 210 may include an electrochemical energy storage system, an electrical energy storage system, and/or a mechanical energy storage system. Additionally, or in the alternative, the energy storage system 210 may include an electrochemical power generation system, such as a fuel cell or other suitable electrochemical cell, and/or a photovoltaic power generation system, such as a solar array. Exemplary electrochemical energy storage systems include batteries, such as lithium-ion batteries, nickel-metal hydride batteries, lead-acid batteries, nickel-zinc batteries, nickel-cadmium batteries, and so forth. Exemplary electrical energy storage systems include capacitors, supercapacitors (e.g., electrostatic double-layer capacitor, electrochemical pseudo-capacitors, hybrid capacitors, etc.), and so forth. Exemplary mechanical energy storage systems include flywheel energy storage systems, compressed air energy storage systems, regenerative braking systems, and so forth. Exemplary fuel cells include solid oxide fuel cells, molten carbonate fuel cells, proton-exchange membrane fuel cells, solid acid fuel cells, alkaline fuel cells, phosphoric acid fuel cells, hydrogen-oxygen fuel cells, and so forth. In some embodiments, an electrochemical power generation system, such as a fuel cell, may be combined with an electrochemical or electrical energy storage system. For example, the fuel cell may charge the electrochemical or electrical energy storage system and/or to provide electrical power to the plurality of hybrid-electric powertrains 202. Additionally, or in the alternative, such electrochemical or electrical energy storage system may receive and store electrical energy provided by the plurality of hybrid-electric powertrains 202.

Respective ones of the plurality of hybrid-electric powertrains 202 may include a power control unit 214. The hybrid-electric propulsion system 200 may include a plurality of power control units 214 electrically coupled to the distribution bus 212. The respective power control units 214 may include one or more power management devices 216, and an electronic controller 218. The one or more power management devices may include one or more inverters, converters, rectifiers, devices operable to control the flow of electrical current, and so forth. For instance, one or more of the power management devices may be operable to condition and/or convert electrical power (e.g., from AC to DC or vice versa). In some embodiments, the one or more power management devices 216 may include one or more inverters. The one or more inverters may convert DC power supplied by the distribution bus 212 to AC power utilized by the respective hybrid-electric powertrain 202 and/or electric machine 206. Additionally, or in the alternative, the one or more power management devices 216 may include one or more rectifiers. The one or more inverters may convert AC power generated by the respective hybrid-electric powertrain 202 and/or electric machine 206 to DC power distributed on the distribution bus 212. AC power utilized by the respective hybrid-electric powertrain 202 and/or electric machine 206.

In some embodiments, the one or more power management devices 216 may be bidirectional. For example, the one or more power management devices 216 may include a synchronous converter, such as a synchronous buck converter. As another example, the one or more power management devices 216 may include a bidirectional interleave converter. In still further embodiments, the one or more power management devices 216 may include one or more autotransformer rectifier units, for example, to convert AC power to DC power. Additionally, or in the alternative, the one or more power management devices 216 may include one or more matrix converters, such as one or more indirect matrix converters and/or one or more direct matrix converters. The one or more matrix converters may have inherent bidirectional power flow capability.

The one or more power management devices 216, such as the one or more inverters, converters, and/or rectifiers, may include semiconductors suitable for high frequency, high voltage, high temperature, high power density, and high efficiency applications, such as silicon carbide and/or gallium nitride. By way of example, the one or more power management devices 216 may be a metal-oxide-semiconductor field-effect transistor (MOSFET), a metal semiconductor field-effect transistors (MESFET), an insulated-gate bipolar transistor (IGBT), a high-electron-mobility transistor (HEMT), or the like. An exemplary power management device 216 may have a nominal efficiency of at least 98%, such as at least 99%. Additionally, or in the alternative, an exemplary power management device 216 may have a power density of from 1 kW/kg to 30 kW/kg, such as from 5 kW/kg to 15 kW/kg, such as from 15 kW/kg to 20 kW/kg, or such as from 20 kW/kg to 30 kW/kg. Additionally, or in the alternative, an exemplary power management device 216 may have a power delivery capacity of from 200 kW to 3 MW, such as from 500 kW to 2 MW, or such as from 1 MW to 3 MW. In some embodiments, the power control unit 214 may include a cooling system, such as a cryogenic cooling system.

The electronic controller 218 of a respective power control unit 214 may be incorporated into or combined with the power control unit 214, or the electronic controller 218 may be provided as a separate component communicatively coupled to the power control unit 214. In some embodiments, the electronic controller 218 and one or more power management devices 216 may be provided as a common unit configured to perform one or more operations of the power control unit 214. Additionally, or in the alternative, the one or more power management devices 216 may be wholly contained within the power control unit 214, or one or more of the power management devices 216 may be located separately from, yet electrically and/or communicatively coupled with, the power control unit 214.

The electronic controller 218 may be configured as or incorporated into an engine control unit (ECU), an electronic engine controller (EEC), a full-authority digital engine control (FADEC) system, or the like. The respective power control units 214, and/or the electronic controller 218 thereof, may be configured as a distributed control system, such as a distributed control system dedicated to a respective hybrid-electric powertrain 202. The respective power control units 214, and/or the electronic controller 218 thereof, may operate independently from one another, for example, without requiring a supervisory control system and without providing communication between the respective power control units 214 and/or electronic controllers 218. The respective power control units 214, and/or the electronic controller 218 thereof, may control at least a portion of the hybrid-electric powertrain 202, such as the electric machine 206, the combustion engine 204, and/or the one or more propulsors 208. Additionally, or in the alternative, the respective power control units 214, and/or the electronic controller 218 thereof, may control the one or more power management devices 216. For example, the power control unit 214 may be operable to control the electrical power provided by the electric machine 206 and/or the energy storage system 210, such as electrical power from the electric machine 206 and/or the energy storage system 210 to the propulsor 208, and/or the electrical power provided to the energy storage system 210 by the electric machine 206.

In some embodiments, the electronic controller 218 may control various further operations of the hybrid-electric powertrain 202 (e.g., in addition to operations of the electric machine 206 and/or of the one or more power management devices 216), such as operations of the combustion engine 204 and/or operations of the propulsor 208. The electronic controller 218 may control a torque output of the hybrid-electric powertrain 202 (e.g., a torque output of the combustion engine 204 and/or of the electric machine 206), such as to the propulsor 208, for example, by controlling a fuel flow to the combustion engine 204 and/or a power output of the electric machine 206. Additionally, or in the alternative, the electronic controller 218 may control a speed and/or a thrust of the propulsor 208, for example, by controlling a fuel flow to the combustion engine 204 and/or a power output of the electric machine 206.

The hybrid-electric propulsion system 200 may include one or more input apparatuses 220. The respective power control units 214 may receive control inputs from a respective input apparatus 220. The input apparatus 220 may include any suitable apparatus for providing control inputs to the respective power control units 214, including manual and/or automated apparatuses. For example, the input apparatus 220 may include one or more thrust levers, power levers, or the like. Additionally, or in the alternative, the input apparatus 220 may include an automatic throttle system, such as an autothrottle, an autothrust, or the like. The one or more input apparatuses 220 may be actuated by a pilot, a copilot, and/or an autopilot system to provide a power input command to respective ones of the plurality of hybrid-electric powertrains 202. The one or more input apparatuses 220 may be located in a cockpit of the aircraft 100 or elsewhere onboard the aircraft 100. In some embodiments, the one or more input apparatuses 220, such as an automatic throttle system, may be actuated by the pilot, the copilot, and/or the autopilot system, to provide a power input command to respective ones of the plurality of hybrid-electric powertrains 202 by specifying a desired flight characteristic, for example, in addition or in the alternative to manually providing the power input command. In some embodiments, the automatic throttle system may include a speed mode and/or a thrust mode. In speed mode, the automatic throttle system may provide power input commands configured to attain a specified target speed, such as a specified target airspeed. The respective power control units 214 may maintain a suitable stall margin and/or a suitable overspeed margin. For example, if a specified target speed is slower than a stall speed, or faster than a maximum speed, the automatic throttle system may provide power input commands configured to maintain a speed close to the specified target speed that is within a range that includes the suitable stall margin and/or the suitable overspeed margin. In thrust mode, the automatic throttle system may provide power input commands configured to maintain a level of thrust corresponding to a respective phase of flight. Exemplary phases of flight may include idle, takeoff, climb, cruise, descent, landing, taxiing, and so forth. The automatic throttle system may provide power input commands configured to maintain a constant thrust during the respective phase of flight, for example, until a transition to a phase of flight. By way of example, during takeoff, the automatic throttle system may provide power input commands corresponding to a takeoff power level, for example, until the takeoff phase transitions to a climb phase. During the climb phase, the automatic throttle system may provide power input commands corresponding to a climb power level, for example, until the climb phase transitions to a cruise phase, and so on. The transition to respective phases of flight may be actuated manually and/or automatically, by the pilot, copilot, and/or autopilot system, as applicable.

Figure 2A:
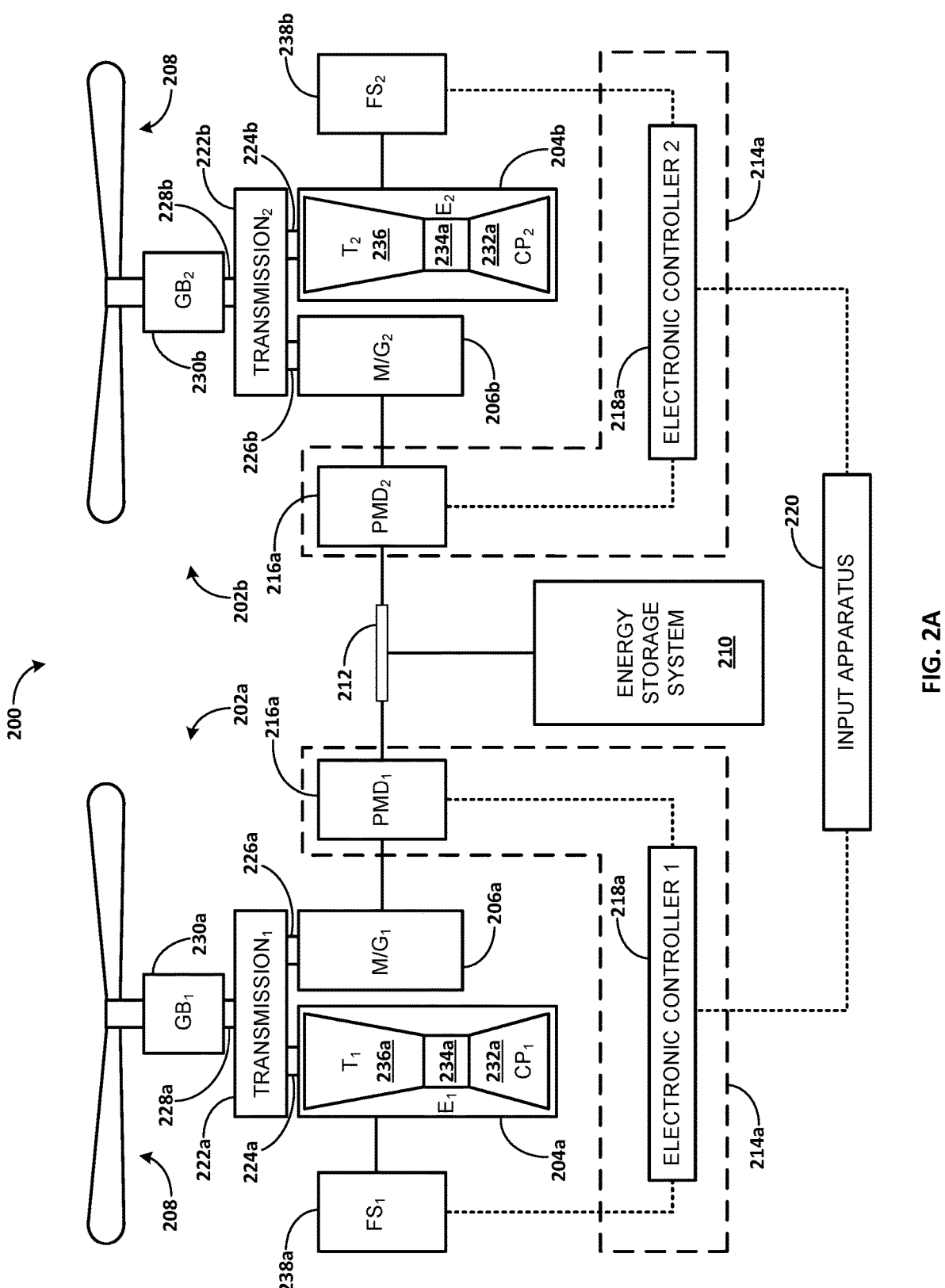
FIG. 2A schematically depicts an exemplary hybrid-electric propulsion system that includes a plurality of hybrid-electric powertrains.
Figure 2B:
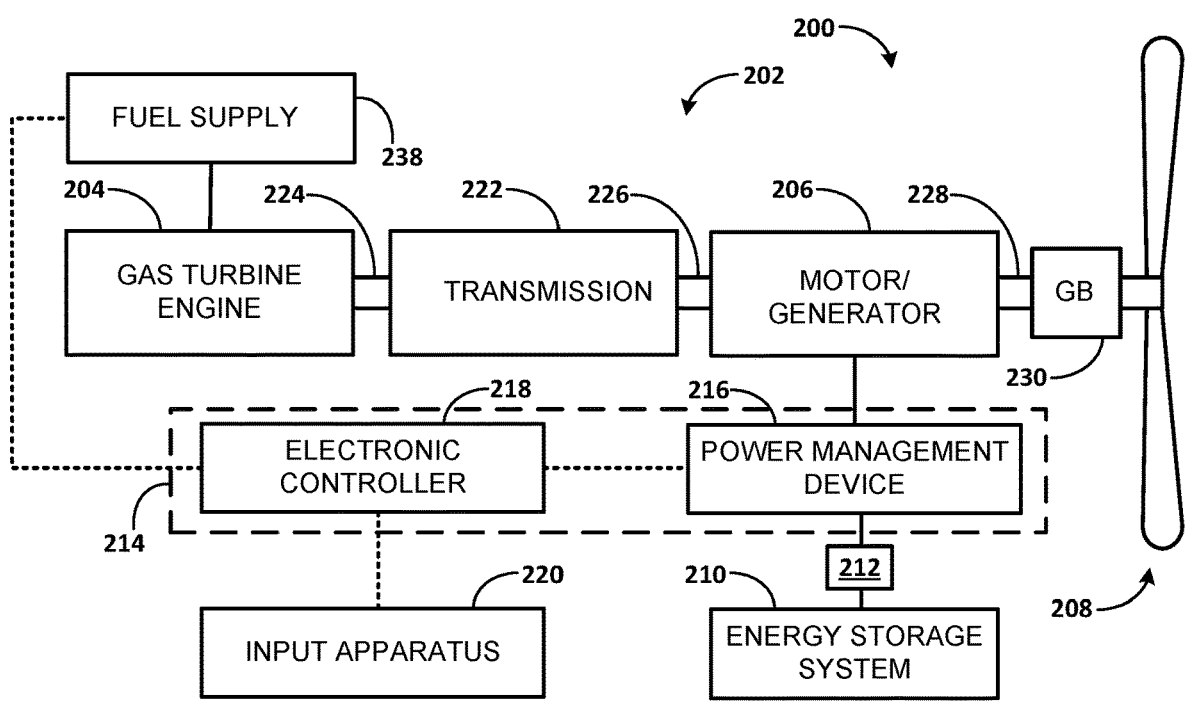
FIG. 2B schematically depicts another exemplary hybrid-electric powertrain.
Figure 2C:
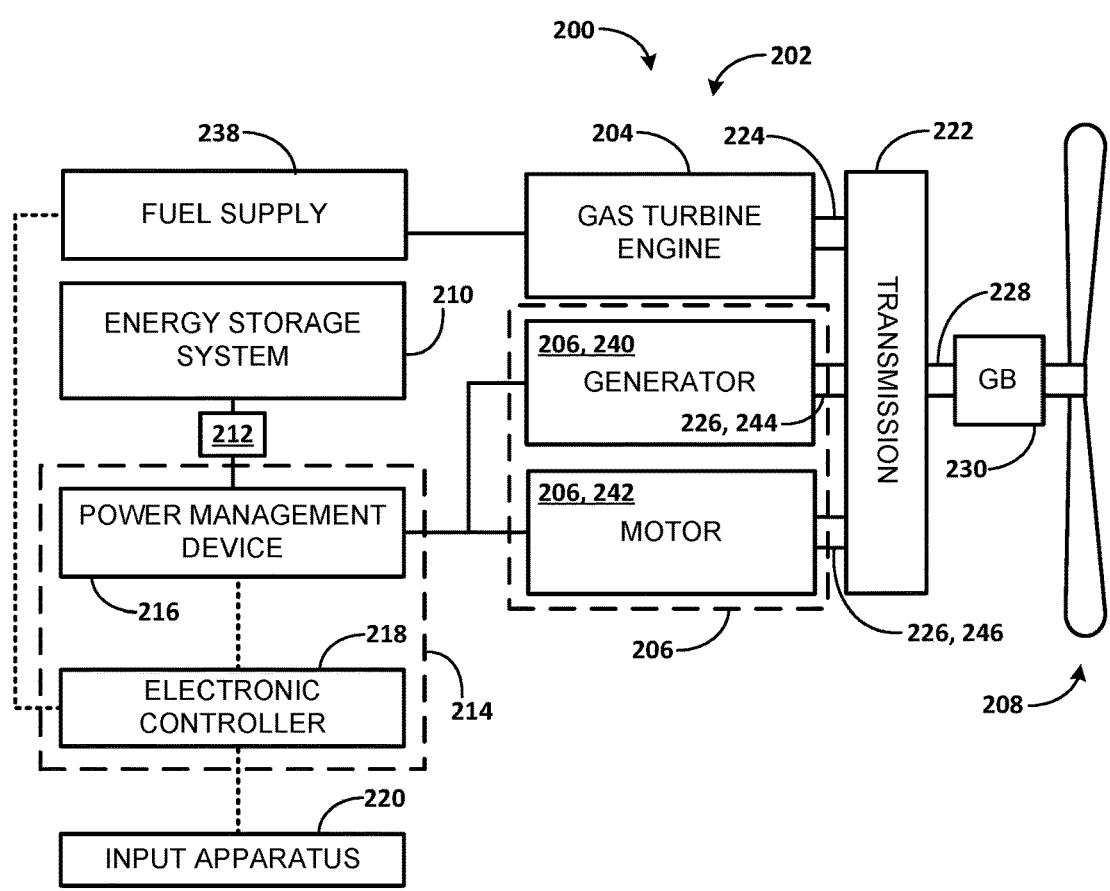
FIG. 2C schematically depicts yet another exemplary hybrid-electric powertrain.

Referring now to FIGS. 2A-2D, exemplary hybrid-electric propulsion systems 200 are further described. In some embodiments, a hybrid-electric propulsion system 200 may include a plurality of hybrid-electric powertrains 202 configured as shown in FIG. 2A. Additionally, or in the alternative, hybrid-electric propulsion system 200 may include a plurality of hybrid-electric powertrains 202 configured as shown in FIGS. 2B, 2C, and/or 2D. Additionally, or in the alternative, in some embodiments, the presently disclosed subject matter may be implemented in an all-electric propulsion system. By way of example, FIG. 2E shows an exemplary all-electric propulsion system and/or powertrain.

A hybrid-electric propulsion systems 200 may include a plurality of hybrid-electric powertrains 202, such as (n)-number of hybrid-electric powertrains 202. By way of example, FIG. 2A shows a hybrid-electric propulsion systems 200 includes a first hybrid-electric powertrain 202a and a second hybrid-electric powertrain 202b. The respective hybrid-electric powertrains 202 may be configured as described with reference to FIG. 1, and/or as further described herein.

The respective hybrid-electric powertrains 202 may be electrically coupled to a distribution bus 212. One or more energy storage systems 210 may be electrically coupled to the distribution bus 212. One or more energy storage systems 210 may be a shared resource for the plurality of hybrid-electric powertrains 202. The one or more energy storage systems 210 may provide electrical power to at least some of the plurality of hybrid-electric powertrains 202. Additionally, or in the alternative respective ones of the plurality of hybrid-electric powertrains 202 may receive electrical power from at least one energy storage system 210 and/or two provide electrical power to at least one energy storage systems 210, such as an energy storage system 210 configured as a shared resource for at least some of the plurality of hybrid-electric powertrains 202.

Respective ones of the plurality of hybrid-electric powertrains 202 may have any desired powertrain configuration. By way of example, exemplary powertrain configurations for a hybrid-electric powertrain 202 include series, parallel, or series-parallel. In general, the term "series" or "series configuration," when used in reference to a hybrid-electric powertrain 202, refers to a hybrid-electric powertrain 202 that has one mechanical source of power configured to drive a propulsor 208. The mechanical power source for a series configuration may be a combustion engine 204 or electric machine 206. In general, the term "parallel" or "parallel configuration," when used in reference to a configuration of a hybrid-electric powertrain 202, refers to a hybrid-electric powertrain 202 configured such that a combustion engine 204 and an electric machine 206 may both provide mechanical power to a propulsor 208, either simultaneously or individually at a given time. In general, the term "series-parallel" or "series-parallel configuration," when used in reference to a configuration of a hybrid-electric powertrain 202, refers to a hybrid-electric powertrain 202 that includes both a series configuration and a parallel configuration incorporated into the hybrid-electric powertrain 202.

A series-parallel configuration may sometimes be referred to as a "power-split configuration" as the series-parallel configuration generally includes one or more transmission assemblies configured to allow the input power and/or the output power to be split between a plurality of resources. Depending on the power split provided by the one or more transmission assemblies, the hybrid-electric powertrain 202 may operate in a series configuration or a parallel configuration, at a given time. With a power-split configuration that includes an input split, a hybrid-electric powertrain 202 may provide mechanical power to a propulsor 208 from both the combustion engine 204 and an electric machine 206, either simultaneously or individually at a given time. With a power-split configuration that includes an output split, a hybrid-electric powertrain 202 may allocate mechanical power input to the transmission assembly between a propulsor 208 and electrical power generation by electric machine 206, either simultaneously or individually at a given time. A hybrid-electric powertrain 202 that includes both input split output split sometimes be referred to as a "compound split", or a "compound power-split configuration."

Regardless of the particular powertrain configuration, a hybrid-electric powertrain 202 may utilize a combustion engine 204, such as a gas turbine engine, to generate power for propulsion provided by one or more propulsors 208 and/or to power an electric machine 206 that, in turn, generates power for propulsion provided by the one or more propulsors 208. The electric machine 206 may be provided as a single unit or as a plurality of units. For example, a first electric machine 206 may be or include a generator, and a second electric machine 206 may be or include an electric motor. Additionally, or in the alternative, hybrid-electric powertrain 202 may include a plurality of electric machines 206, such as a plurality of generators and/or a plurality of electric motors. The electrical power generated by an electric machine 206 may be converted to mechanical power for rotating the one or more propulsors 208. Additionally, or in the alternative, the electrical power generated by an electric machine 206 may be provided to the energy storage system 210. Additionally, or in the alternative, the energy storage system 210 may supply electrical power to an electric machine 206, and the electric machine 206 may convert the electrical power into mechanical power for rotating the one or more propulsors 208. The distribution and use of power by the plurality of hybrid-electric powertrains 202 may depend at least in part on one or more operating conditions of the hybrid-electric propulsion system 200 and/or the respective hybrid-electric powertrains 202, and/or at least in part on a phase of flight of the aircraft 100 powered by the hybrid-electric propulsion system 200.

A series configuration may include an electric machine 206 drivingly coupled to the one or more propulsors 208, and a combustion engine 204 drivingly coupled to the electric machine 206. The combustion engine 204 may drive the electric machine 206, generating electrical power, and the electrical power generated by the electric machine 206 may be utilized to drive the one or more propulsors 208. For example, the electric machine 206 may include a generator configured to generate electrical power and/or one or more electric motors configured to drive the one or more propulsors 208. Additionally, or in the alternative, electrical power generated by the electric machine 206 may be provided to the energy storage system 210. In some embodiments, a series configuration may include a distributed electric powertrain. A distributed electric powertrain may include an electric machine 206 configured as a generator powered by a combustion engine 204, and a plurality of electric machines 206 configured as electric motors that receive electrical power from the generator and that respectively drive a corresponding propulsor 208.

A parallel configuration may include a combustion engine 204 and an electric machine 206 respectively drivingly coupled to one or more propulsors 208. The one or more propulsors 208 may be powered, at a given time, by the combustion engine 204, the electric machine 206, or both the combustion engine 204 and the electric machine 206. The one or more propulsors 208 may be powered, at a given time, by the combustion engine 204 and/or the electric machine 206 simultaneously and/or individually. Additionally, or in the alternative, the combustion engine 204 may drive the one or more propulsors 208 and/or the electric machine 206, for example simultaneously and/or individually. A parallel configuration may include a single-shaft configuration or a double-shaft configuration. A single-shaft configuration may include a driveshaft drivingly coupled to the combustion engine 204 and the electric machine 206, with the electric machine 206 drivingly coupled to the propulsor 208, and with a transmission disposed between the combustion engine 204 and the electric machine 206. A double-shaft configuration may include a first driveshaft drivingly coupled to the combustion engine 204 and a second driveshaft drivingly coupled to the electric machine 206. A double-shaft configuration include a transmission configured to transfer power from the first driveshaft and/or the second driveshaft to the propulsor 208.

Referring now to FIG. 2A, a hybrid-electric propulsion system 200 may include a plurality of hybrid-electric powertrains 202 configured as shown. In some embodiments, the hybrid-electric powertrains 202 shown in FIG. 2A may represent a parallel configuration. Additionally, or in the alternative, the hybrid-electric powertrains 202 shown in FIG. 2A may represent a power-split configuration. As shown, a hybrid-electric powertrain 202 may include a combustion engine 204 and an electric machine 206 respectively mechanically coupled to a transmission assembly 222.

The combustion engine 204 may be mechanically coupled to the transmission assembly 222 by an engine-shaft 224. The electric machine 206 may be mechanically coupled to the transmission assembly 222 by a machine-shaft 226. The transmission assembly 222 may transfer mechanical power from the combustion engine 204 and/or the electric machine 206 to one or more propulsors 208. A propulsor 208 may be mechanically coupled to the transmission assembly 222 by a propulsor-shaft 228. The transmission assembly 222 may include gearing suitable to provide a desired rotational speed of the propulsor 208. Additionally, or in the alternative, the hybrid-electric powertrain 202 may include a propulsor gearbox 230 configured to provide a desired rotational speed of the propulsor 208. For example, the propulsor gearbox 230 may be disposed between the transmission assembly and the propulsor 208.

The combustion engine 204 may be a turbine engine. For example, the combustion engine 204 may include, in serial flow relationship, one or more compressor sections 232, a combustion section 234, and one or more turbine sections 236. The one or more compressor sections 232 may intake and compress air supplied to the combustion section 234. The pressurize air may be mixed with fuel in the combustion section 234, and the air and fuel mixture may be combusted, generating combustion products that flow into the one or more turbine sections 236. The flow of combustion products through the one or more turbine sections 236 may generate torque that rotates one or more spools of the turbine engine. The one or more compressor sections 232 may be coupled to one or more schools of the turbine engine, such that rotation of the one or more turbine sections 236 by the combustion products flowing therethrough may rotate the one or more compressor sections 232 to compress the air flowing therethrough. Mechanical energy from rotation of the one or more turbine sections 236 may be utilized to power one or more propulsors 208 and/or to generate electrical power by an electric machine 206 mechanically coupled to the combustion engine 204, for example, by the transmission assembly 222.

The hybrid-electric powertrain 202 may include one or more electric machines 206. In some embodiments, as shown in FIG. 2A, the hybrid-electric powertrain 202 may include an electric machine 206 configured as a motor/generator. Additionally, or in the alternative, a hybrid-electric powertrain 202 that has a parallel configuration may include a first electric machine 206 configured as an electric motor and a second electric machine 206 configured as a generator. An electric machine 206 configured as a motor/generator or as an electric motor may receive electrical power from the energy storage system 210. Additionally, or in the alternative, an electric machine 206 configured as a motor/generator or as a generator may generate electrical power, for example, under mechanical power provided by the combustion engine 204 and/or the propulsor 208, such as by way of the transmission assembly 222. Electrical power generated by the electric machine 206 may be converted to mechanical power to power the propulsor 208. Additionally, or in the alternative, electrical power generated by the electric machine 206 may be provided to the energy storage system 210.

As shown in FIG. 2A, the electrical power supply to and/or from hybrid-electric powertrain 202 is to be controlled by a power control unit 214 electrically coupled to a distribution bus 212. The power control unit 214 may control a supply of electrical power from the distribution bus 212 and/or the energy storage system 210 to an electric machine 206 included in the hybrid-electric powertrain 202, such as to an electric machine 206 configured as an electric motor or as a motor/generator. Additionally, or in the alternative, the power control unit 214 may control a supply of electrical power from the electric machine 206 to the distribution bus 212 and/or the energy storage system 210, such as to an electric machine to 06 configured as a generator or as a motor/generator. The power control unit 214 may include one or more power management devices 216, and electronic controller 218 provided as an integrated component of the power control unit 214 or as a stand-alone unit communicatively coupled to the one or more power management devices 216.

The hybrid-electric powertrain 202 may include a fuel supply system 238 configured to supply fuel to the combustion engine 204. The fuel supply system 238 may include one or more fuel valves, distribution headers, fuel nozzles, and so forth. The fuel supply system 238 may be controlled by the electronic controller 218.

As shown in FIG. 2A, the hybrid-electric propulsion system 200 includes an input apparatus 220 configured to provide power level requests to respective ones of the power control units 214 associated with a corresponding hybrid-electric powertrain 202. For example, the first hybrid-electric powertrain 202a may include a first power control unit 214a and the second hybrid-electric powertrain 202b may include a second power control unit 214b. The first power control unit 214a may include a first one or more power management devices 216a and a first electronic controller 218a. The first electronic controller 218a may receive power level requests from the input apparatus 220. The first electronic controller 218a may provide power level commands to the first one or more power management devices 216a. The first one or more power management devices 216a may control the supply of electrical power to and/or from the first hybrid-electric powertrain 202a based at least in part on the power level commands from the first electronic controller 218a.

The second power control unit 214b may include a second one or more power management devices 216b and a second electronic controller 218b. The second electronic controller 218b may receive power level requests from the input apparatus 220. The second electronic controller 218b may provide power level commands to the second one or more power management devices 216b. The second one or more power management devices 216b may control the supply of electrical power to and/or from the second hybrid-electric powertrain 202b based at least in part on the power level commands from the second electronic controller 218b.

Referring now to FIG. 2B, another exemplary hybrid-electric propulsion system is shown. In some embodiments, a hybrid-electric propulsion system 200 may include a plurality of hybrid-electric powertrains 202 configured as shown in FIG. 2B. In some embodiments, the hybrid-electric powertrain 202 shown in FIG. 2B may represent a series configuration. Additionally, or in the alternative, the hybrid-electric powertrain 202 shown in FIG. 2B may represent a power-split configuration. As shown, a hybrid-electric powertrain 202 may include, in a series configuration, a combustion engine 204 (e.g., configured as a gas turbine engine) mechanically coupled to an electric machine 206 by a transmission assembly 222, and the electric machine 206 mechanically coupled to one or more propulsors 208. Additionally, or in the alternative, a hybrid-electric powertrain 202 may include, in a series configuration, an electric machine 206 mechanically coupled to a combustion engine 204 by a transmission assembly 222, and the combustion engine 204 mechanically coupled to one or more propulsors 208. The combustion engine 204 may be mechanically coupled to the transmission assembly 222 by an engine-shaft 224. The transmission assembly 222 may be mechanically coupled to the electric machine 206 by a machine-shaft 226.

The one or more propulsors 208 may be mechanically coupled to the hybrid-electric powertrain 202 (e.g., to the electric machine 206 or to combustion engine 204) by a propulsor-shaft 228.

A hybrid-electric powertrain 202 that has a series configuration may include one or more electric machines 206. For example, as shown in FIG. 2B, an electric machine 206 may be or include a motor/generator. Additionally, or in the alternative, a hybrid-electric powertrain 202 that has a series configuration may include a first electric machine 206 configured as an electric motor and a second electric machine 206 configured as a generator. An electric machine 206 configured as a motor/generator or as an electric motor may receive electrical power from the energy storage system 210. Additionally, or in the alternative, an electric machine 206 configured as a motor/generator or as a generator may generate electrical power, for example, under mechanical power provided by the combustion engine 204 and/or the propulsor 208, such as by way of the transmission assembly 222. Electrical power generated by the electric machine 206 may be converted to mechanical power to power the propulsor 208. Additionally, or in the alternative, electrical power generated by the electric machine 206 may be provided to the energy storage system 210.

Referring now to FIG. 2C, another exemplary hybrid-electric propulsion system is shown. In some embodiments, a hybrid-electric propulsion system 200 may include a plurality of hybrid-electric powertrains 202 configured as shown in FIG. 2C. In some embodiments, the hybrid-electric powertrain 202 shown in FIG. 2C may represent a series-parallel configuration. Additionally, or in the alternative, the hybrid-electric powertrain 202 shown in FIG. 2C may represent a power-split configuration. As shown, a hybrid-electric powertrain 202 may include, in a series-parallel configuration, a combustion engine 204 (e.g., configured as a gas turbine engine) mechanically coupled to a transmission assembly 222, for example, by an engine-shaft 224, and one or more electric machines 206 mechanically coupled to the transmission assembly 222, for example, by a corresponding one or more machine-shafts 226. In some embodiments, a hybrid-electric powertrain 202 that has a series-parallel configuration may include a generator 240 and electric motor 242. The generator 240 and the electric motor 242 may be provided as separate electric machines 206, or as a combined electric machine 206. The generator 240 may be mechanically coupled to the transmission assembly 222 by a generator-shaft 244. The electric motor 242 may be mechanically coupled to the transmission assembly 222 by a motor-shaft 246. One or more propulsors 208 may be mechanically coupled to the hybrid-electric powertrain 202, such as to the transmission assembly 222, by a propulsor-shaft 228.

As depicted in FIG. 2C, the combustion engine 204 may provide mechanical power to the one or more propulsors 208 and/or to the generator 240, for example, by way of the transmission assembly 222. At a given time, mechanical power from the combustion engine 204 may be provided to the one or more propulsors 208 and to the generator 240, simultaneously or individually. The generator 240 may generate electrical power from mechanical power provided, for example, from the combustion engine 204 and/or otherwise from the transmission assembly 222. The electrical power generated by the generator 240 be supplied to the distribution bus 212 and/or the energy storage system 210, for example according to power level commands from the power control unit 214. Additionally, or in the alternative, electrical power generated by the generator 240 may be supplied to the electric motor 242.

The one or more propulsors 208 may receive mechanical power from the combustion engine 204 and/or from the electric motor 242, for example, by way of the transmission assembly 222. At a given time, mechanical power may be provided to the one or more propulsors 208 by the combustion engine 204 and the electric motor 242, simultaneously or individually. The electric motor 242 may convert electrical power to mechanical power. The electrical power may be provided by the energy storage system 210 and/or the distribution bus 212, for example according to power level commands from the power control unit 214. Additionally, or in the alternative, mechanical power generated by the electric motor 242 may be supplied to the generator 240.

Figure 2D:
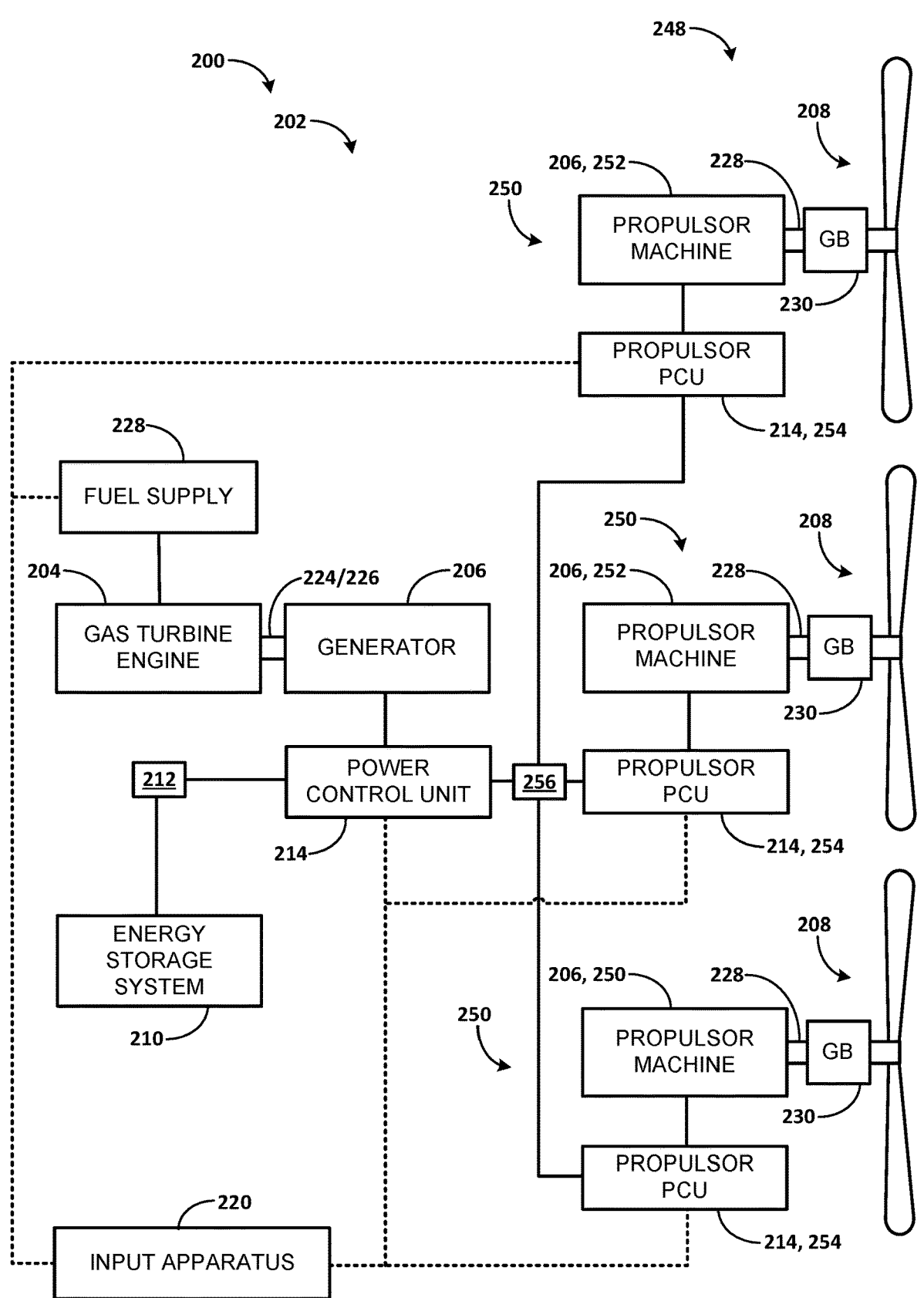
FIG. 2D schematically depicts yet another exemplary hybrid-electric powertrain.
Figure 2E:
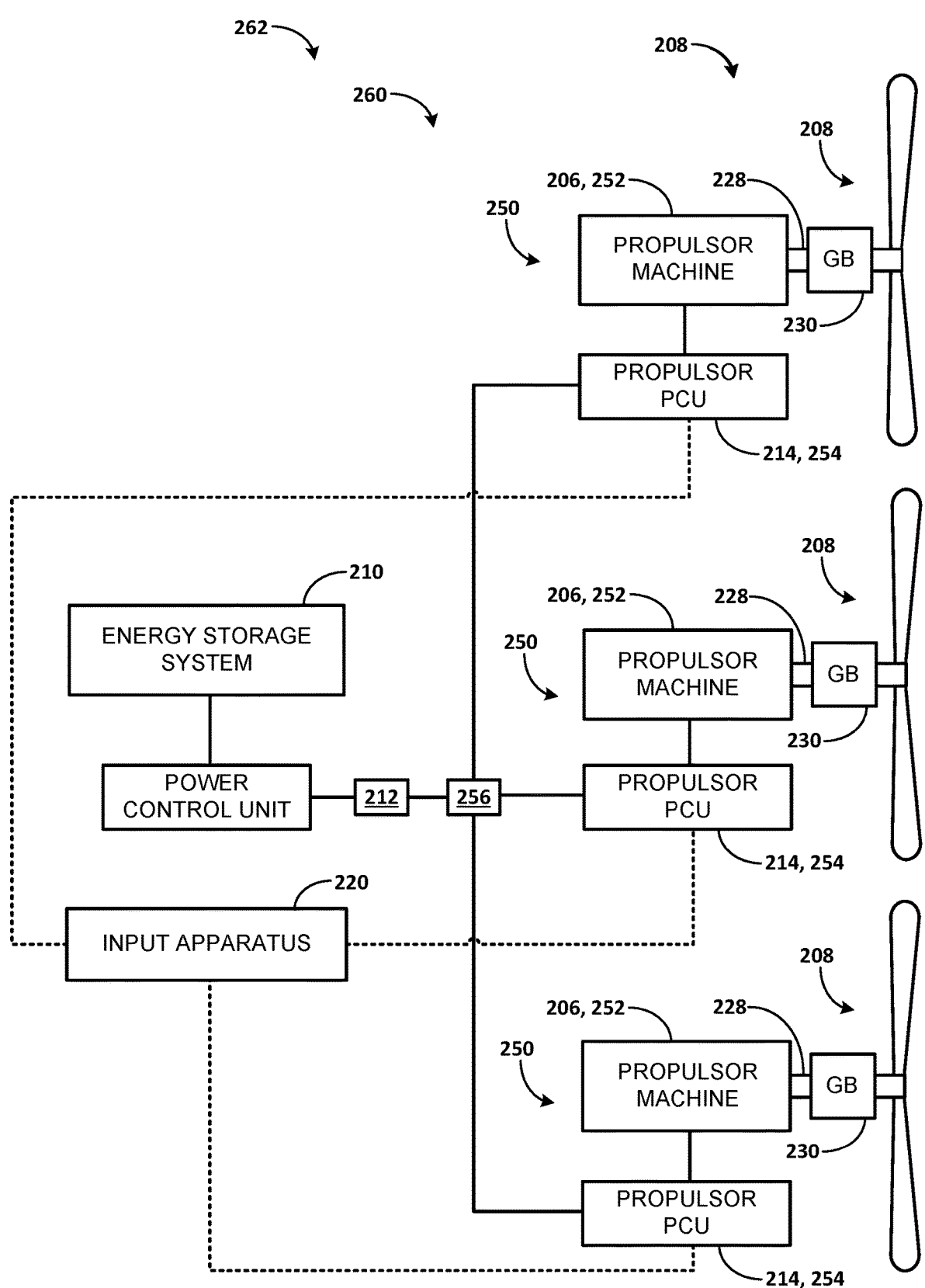
FIG. 2E schematically depicts an exemplary all-electric powertrain.

Referring now to FIG. 2D, another exemplary hybrid-electric propulsion system is shown. In some embodiments, a hybrid-electric propulsion system 200 may include a plurality of hybrid-electric powertrains 202 configured as shown in FIG. 2D. In some embodiments, the hybrid-electric powertrain 202 shown in FIG. 2D may represent a series configuration that includes a distributed propulsion configuration. Additionally, or in the alternative, the hybrid-electric powertrain 202 shown in FIG. 2C may represent a power-split configuration. As shown, hybrid-electric powertrain 202 may include, in a series and/or distributed propulsion configuration, a combustion engine 204 (e.g., configured as a gas turbine engine) mechanically coupled to an electric machine 206 (e.g., configured as a generator or a motor/generator). The combustion engine 204 may be mechanically coupled to the electric machine 206 by an engine-shaft 224 and/or a machine shaft 226. The hybrid-electric powertrain 202 shown in FIG. 2D may include a transmission assembly 222 (not shown, see, e.g., FIG. 2B) disposed between the combustion engine 204 and the electric machine 206.

As shown in FIG. 2D, hybrid-electric powertrain 202 may distribute electrical power generated by the electric machine 206 to a distributed propulsion system 248 that includes a plurality of propulsors 208, for example according to power level commands from the power control unit 214. Additionally, or in the alternative, electrical power generated by the electric machine 206 may be supplied to a distribution bus 212 and/or an energy storage system 210, for example according to power level commands from the power control unit 214. At a given time, the electrical power may be supplied simultaneously or individually to the distributed propulsion system 248, and/or to the distribution bus 212 and/or the energy storage system 210. At a given time, electrical power may be supplied to the distributed propulsion system 248 from the electric machine 206, and/or the distribution bus 212 and or the energy storage system 210, simultaneously or individually. The electrical power may be supplied to the distributed propulsion system 248 according to power level commands from the power control unit 214.

The distributed propulsion system 248 may include a plurality of propulsor-power units 250. Respective ones of the plurality of propulsor-power units 250 may include an electric machine 206, power control unit 214 and a propulsor 208. An electric machine 206 included as part of a propulsor-power unit 250 may sometimes be referred to as a propulsor machine 252. The power control unit 214 included as part of a propulsor-power unit 250 may sometimes be referred to as a propulsor-power control unit 254. The propulsor machine 252 may be mechanically coupled to the propulsor 208, for example, by a propulsor-shaft 228. The propulsor-power unit 250 may include a propulsor gearbox 230 configured to provide a desired rotational speed of the propulsor 208. For example, the propulsor gearbox 230 may be disposed between the propulsor machine 252 and the propulsor 208.

The respective propulsor-power control units 254 may be electrically coupled to a propulsor-distribution bus 256 configured to supply power to respective ones of the plurality of propulsor-power units 250 and/or to receive power from respective ones of the plurality of propulsor-power units 250. Electrical power may be supplied to the propulsor-distribution bus 256 by the power control unit 214. The propulsor-distribution bus 256 may receive electrical power from the electric machine 206, and/or the energy storage system 210 and/or the distribution bus 212, for example, according to power level commands from the power control unit 214.

The respective propulsor-power control units 254 may include one or more power management devices 216 and an electronic controller 218, respectively configured substantially as described herein with respect to the power control units 214. The one or more power management devices 216 included as part of a propulsor-power control unit 254 may sometimes be referred to as a propulsor-power management device. The electronic controller 218 included as part of a propulsor-power control unit 254 may sometimes be referred to as a propulsor-electronic controller. The respective propulsor-power units 250 may receive electrical power from the propulsor-distribution bus 256, for example, according to power level commands from the propulsor-electronic controller of the propulsor-power control unit 254. The respective propulsor machines 252 may convert electrical power to mechanical power for rotating the corresponding propulsor 208. Additionally, or in the alternative, the respective propulsor machines 252 may generate electrical power from mechanical input from rotation of the corresponding propulsor 208. The propulsor-power control unit 254 corresponding to a respective propulsor machine 252 may supply electrical power generated by the propulsor machine 252 to the propulsor-distribution bus 256.

Referring now to FIG. 2E, an exemplary all-electric powertrain 260 is shown. The all-electric powertrain 260 shown in FIG. 2E may be configured substantially as described with respect to the hybrid-electric powertrain 202 described with reference to FIG. 2D, except that the all-electric powertrain 260 does not include a combustion engine 204. As shown, the all-electric powertrain 260 may receive all of its power from energy storage system 210 and/or a distribution bus 212. In some embodiments, a plurality of all-electric powertrains 260 configured as shown, for example, in FIG. 2E, may be electrically coupled to the distribution bus 212. Such a plurality of all-electric powertrains 260 may define an all-electric propulsion system 262. Additionally, or in the alternative, an all-electric powertrain 260, as shown, for example, in FIG. 2E, may itself define an all-electric propulsion system 262, for example, without requiring additional all-electric powertrains 260 electrically coupled to the distribution bus 212.

Referring now to FIGS. 3A-3D, exemplary operating states of a hybrid-electric propulsion system 200 or an all-electric propulsion system 262 are further described. FIGS. 3A-3D generally show, by way of example, the hybrid-electric propulsion system 200 depicted in FIG. 2A. Operating states described with reference to FIGS. 3A-3D may be exhibited by any propulsion system in accordance with the present disclosure, including the hybrid-electric propulsion system 200 and/or all-electric propulsion systems 262 disclosed herein. The description that follows refers to hybrid-electric propulsion systems 200, and may be applied similarly to all-electric propulsion systems.

A hybrid-electric propulsion system 200 or an all-electric propulsion system 262 may be operated according to one or more operating states from time to time. Exemplary operating states may include an electrical power consumption operating state, described with reference to FIG. 3A; an electrical power generation operating state, described with reference to FIG. 3B; a partial power transfer operating state, described with reference to FIG. 3C; and a full power transfer, described with reference to FIG. 3D. A hybrid-electric propulsion system 200 or an all-electric propulsion system 262 may exhibit any one or more of such operating states, for example, while operating at any one or more of a rated speed, a cruising speed, a nominal operating speed, a high-power operating speed, and/or a low-power operating speed.

Referring to FIG. 3A, in some embodiments, a hybrid-electric propulsion system 200 may exhibit an operating state that includes an electrical power consumption operating state. As shown in FIG. 3A, an electrical power consumption operating state includes a net electrical power consumption from the energy storage system 210, for example, by respective ones of the plurality of hybrid-electric powertrains 202. The net electrical power consumption from the energy storage system 210 is illustrated in FIG. 3A by the shaded arrows leading from the energy storage system 210 to respective ones of the plurality of hybrid-electric powertrains 202, illustrating a net flow of electrical power from the energy storage system 210 to the plurality of hybrid-electric powertrains 202.

In some embodiments, during an operating state that includes an electrical power consumption operating state, at least portion of the power output to the propulsors 208 of the respective hybrid-electric powertrains 202 may be provided by a corresponding electric machine 206. For example, a first portion of the power output to the propulsors 208 may be provided by corresponding combustion engine 204, and a second portion of the power output to the propulsors 208 may be provided by the corresponding electric machine 206. In some embodiments, all of the power output to the propulsors may be provided by the corresponding electric machine 206 during an electrical power consumption operating state. In some embodiments, an electrical power consumption operating state may include operating the respective hybrid-electric powertrains 202 at a rated speed. For example, the combustion engine 204 and/or the electric machine 206 may be operated at or near rated speed. By way of example, an electrical power consumption operating state may correspond to an aircraft 100 performing a takeoff or climbing maneuver. In some embodiments, the respective hybrid-electric powertrains 202 may draw a relatively high amount of electrical power from the energy storage system 210, such as up to a threshold level of electrical power. The respective power control units 214 may limit the supply electrical power from the energy storage system 210 to the threshold level. The threshold level may correspond to a power discharge capability of the energy storage system 210, for example, when the energy storage system 210 is operating properly and/or including an operating margin selected to avoid damage to the energy storage system 210. For example, the respective power control units 214 may limit the supply electrical power to the corresponding electric machine 206 based at least in part on the threshold level corresponding to the power discharge capability of the energy storage system 210. Such a limit may arise, by way of example, during an electrical power consumption operating state.

Referring to FIG. 3B, in some embodiments, a hybrid-electric propulsion system 200 may exhibit an operating state that includes an electrical power generation operating state. As shown in FIG. 3B, an electrical power generation operating state includes a net electrical power generation by the plurality of hybrid-electric powertrains 202, for example, supplied to the energy storage system 210. The net electrical power consumption by the plurality of hybrid-electric powertrains 202 is illustrated in FIG. 3B by the shaded arrows leading from the respective ones of the plurality of hybrid-electric powertrains 202 to the energy storage system 210, illustrating a net flow of electrical power from the plurality of hybrid-electric powertrains 202 to the energy storage system 210.

In some embodiments, during an operating state that includes an electrical power generation operating state, one or more of the electric machines 206 corresponding to the respective hybrid-electric powertrain 202 may generate electrical power provided to the energy storage system 210. In some embodiments, an electrical power generation operating state may include operating the respective electric machines 206 at or near a rated speed. For example, the respective electric machine 206 may generate up to a threshold level of electrical power. Additionally, or the alternative, an electrical power generation operating state may include supplying the energy storage system 210 with up to a threshold level of electrical power. The respective power control units 214 may limit the supply electrical power to the energy storage system 210 to the threshold level. The threshold level may correspond to a power receiving capability (e.g., a charging capability and/or a consumption capability) of the energy storage system 210, for example, when the energy storage system 210 is operating properly and/or including an operating margin selected to avoid damage to the energy storage system 210. For example, the respective power control units 214 may limit the generation of electrical power by the corresponding electric machine 206 based at least in part on the threshold level corresponding to the power receiving capability of the energy storage system 210. Such a limit may arise, by way of example, during an electrical power generation operating state.

Referring to FIG. 3C, in some embodiments, a hybrid-electric propulsion system 200 may exhibit an operating state that includes a partial power transfer operating state. As shown in FIG. 3C, a partial power transfer operating state includes a partial transfer of power generated by one or more transferring hybrid-electric powertrain 202 to one or more receiving hybrid-electric powertrains 202 of the hybrid-electric propulsion system 200. For example, as shown in FIG. 3C, during a partial power transfer operating state, a first hybrid-electric powertrain 202a may receive electrical power generated by a second hybrid-electric powertrain 202b, for example by the second combustion engine 204b. A first portion of the power generated by the second hybrid-electric powertrain 202b may be utilized to rotate the second propulsor 208b and a second portion of the power generated by the second hybrid-electric powertrain 202b may be transferred to the first hybrid-electric powertrain 202a. The partial power transfer from the second hybrid-electric powertrain 202b is illustrated in FIG. 3C by the shaded arrows leading from the second hybrid-electric powertrain 202b to the first hybrid-electric powertrain 202a, illustrating a net flow of electrical power from the second hybrid-electric powertrain 202b to the first hybrid-electric powertrain 202a.

In some embodiments, during an operating state that includes a partial power transfer operating state, at least one electric machine 206 corresponding to a respective hybrid-electric powertrain 202 may be generating electrical power and at least one other electric machine 206 corresponding to a respective at least one other hybrid electrical powertrain 202 may be consuming electrical power, for example, to provide mechanical power for rotating a corresponding one or more propulsors 208. All or a portion of the electrical power generated by the at least one electric machine 206 may be supplied to the at least one other electric machine 206. In some embodiments, a portion of the electrical power generated by the at least one electric machine 206 may be supplied to the energy storage system 210. Additionally, or in the alternative the power generated by the at least one electric machine 206 may constitute all or a portion of the electrical power consumed by the at least one other electric machine 206. In some embodiments, a portion of the electrical power consumed by the at least one other electric machine 206 may be supplied by the energy storage system 210.

Referring to FIG. 3D, in some embodiments, a hybrid-electric propulsion system 200 may exhibit an operating state that includes a full power transfer operating state. As shown in FIG. 3D, a full power transfer operating state includes a full transfer of power generated by one or more transferring hybrid-electric powertrain 202 to one or more receiving hybrid-electric powertrains 202 of the hybrid-electric propulsion system 200. For example, as shown in FIG. 3D, during a full power transfer operating state, a first hybrid-electric powertrain 202a may transfer all of the power generated by the first hybrid-electric powertrain 202a, as electrical power, to a second hybrid-electric powertrain 202b. The full transfer of power may include any desired power level of a respective transferring hybrid-electric powertrain 202, such as a portion of and/or up to the maximum power generation capability of the transferring hybrid-electric powertrain 202. In some embodiments, during a full power transfer operating state, no greater than a negligible amount (e.g., none) of the power generated by the first hybrid-electric powertrain 202a may be transferred to the first propulsor 208a. Additionally, or in the alternative, rotation of the first propulsor 208a may contribute to the power generation by the first hybrid-electric powertrain 202a. The full power transfer to the second hybrid-electric powertrain 202b is illustrated in FIG. 3D by the shaded arrows leading from the first hybrid-electric powertrain 202a to the second hybrid-electric powertrain 202b, illustrating a net flow of electrical power from the first hybrid-electric powertrain 202a to the second hybrid-electric powertrain 202b.

The respective power control units 214 may limit the generation of electrical power by the corresponding electric machine 206 to a threshold level, for example, corresponding to the power receiving capability (e.g., a charging capability and/or a consumption capability) of the energy storage system 210. Such a limit may arise, by way of example, during a partial power transfer operating state and/or a full power transfer operating state. In this way, the respective power control units 214 may protect the energy storage system 210 from damage that might otherwise occur from an excessive supply of electrical power to the energy storage system 210, for example, in the event of an increase in power generation and/or a decrease in power consumption by one of the electric machines 206. Additionally, or in the alternative, the respective power control units 214 may limit the consumption of electrical power by the corresponding electric machine 206 to a threshold level, for example, corresponding to the power discharge capability of the energy storage system 210. Such a limit may arise, by way of example, during a partial power transfer operating state and/or a full power transfer operating state. In this way, the respective power control units 214 may protect the energy storage system 210 from damage that might otherwise occur from an excessive discharge of electrical power by energy storage system 210, for example, in the event of an increase in power generation and/or a decrease in power consumption by one of the electric machines 206.

Referring now to FIG. 4, exemplary power control modules 400 are described. A power control module 400 may be utilized to control a respective hybrid-electric powertrain 202 and/or a respective all-electric powertrain 260. The description that follows refers to hybrid-electric propulsion systems 200, and may be applied similarly to all-electric propulsion systems. The power control module 400 may be incorporated into and/or utilized by a power control unit 214, such as an electronic controller 218 of the power control unit 214. A plurality of power control units 214, such as the electronic controllers 218 thereof, corresponding to respective ones of the plurality of hybrid-electric powertrains 202 may respectively include a power control module 400 configured according to the present disclosure.

For example, with further reference to FIG. 2A, the first power control unit 214a corresponding to the first hybrid-electric powertrain 202a may include a first electronic controller 218a that includes a first power control module 400. The first power control unit 214a and/or the first electronic controller 218a may utilize the first power control module 400 to provide power level commands 402, for example, to the first one or more power management devices 216a and/or to a first one or more controllable components 404a associated therewith. Additionally, or in the alternative, the first power control unit 214a and/or the first electronic controller 218a may utilize the first power control module 400 to provide power level commands 402 to one or more other controllable components 404a associated with the first hybrid-electric powertrain 202a, such as one or more controllable components 404a associated with the first fuel supply system 238a, and/or one or more controllable components 404a associated with the first combustion engine 204a and/or the first electric machine 206a.

The second power control unit 214b corresponding to the second hybrid-electric powertrain 202b may include a second electronic controller 218b that includes a second power control module 400. The second power control unit 214b and/or the second electronic controller 218b may utilize the second power control module 400 to provide power level commands 402, for example, to the second one or more power management devices 216b and/or to a second one or more controllable components 404b associated therewith. Additionally, or in the alternative, the second power control unit 214b and/or the second electronic controller 218b may utilize the second power control module 400 to provide power level commands 402 to one or more other controllable components 404b associated with the second hybrid-electric powertrain 202b, such as one or more controllable components 404b associated with the second fuel supply system 238b, and/or one or more controllable components 404b associated with the second combustion engine 204b and/or the second electric machine 206b.

As shown in FIG. 4, in some embodiments, a power control module 400 may include one or more control limit modules 500. Additionally, or in the alternative, a power control module 400 may include one or more control command modules 600. A control limit module 500 may determine a power level-upper control limit 502 (power level-UCL) and/or a power level-lower control limit 504 (power level-LCL) for a respective one of the plurality of hybrid-electric powertrains 202. In some embodiments, the control limit module 500 and/or the power control module 400 may include a capacity allocation module 501. The capacity allocation module 501 may define a portion of the control limit module 500, or the capacity allocation module 501 may be provided as a separate module. The capacity allocation module 501 may allocate to a respective hybrid-electric powertrain 202, a capacity limit 503 for a shared system that may be controlled by the power control module 400. In some embodiments, the capacity allocation module 501 may allocate a capacity limit 503 corresponding to a power level for the hybrid-electric powertrain 202. Additionally, or in the alternative, the capacity allocation module 501 may allocate a capacity limit 503 to a thrust level, a torque level, and/or to one or more other parameters of the hybrid-electric powertrain 202. In some embodiments, the capacity limit 503 may be determined for a respective parameter of the hybrid-electric powertrain 202 by way of an upper control limit and/or a lower control limit.

The control limit module 500 may include an upper control limit submodule 506 and/or a lower control limit submodule 508. The upper control limit submodule 506 and the lower control limit submodule 508 may be provided as a combined control limit module 500 and/or as separate submodules 506/508. The upper control limit submodule 506 may be configured to determine a capacity limit 503 with respect to an upper capacity of the respective parameter of the hybrid-electric powertrain 202. For example, the upper control limit submodule 506 may determine the power level-UCL 502. The power level-UCL 502 may represent an upper limit for a power level command 402 determined by the control command module 600 for a power control unit 214 corresponding to the respective hybrid-electric powertrain 202. Additionally, or in the alternative, the upper control limit submodule 506 may determine an upper control limit for one or more other parameters associated with the hybrid-electric powertrain 202, such as an upper control limit for a trust level and/or an upper control limit for a torque level. An upper control limit for a thrust level and/or an upper control limit for a toque level may represent an upper limit for a corresponding control command determined by the control command module 600 for such trust level or torque level corresponding to the respective hybrid-electric powertrain 202.

The lower control limit submodule 508 may be configured to allocate a capacity limit 503 with respect to a lower capacity of the respective parameter of the hybrid-electric powertrain 202. For example, the lower control limit submodule 508 may determine the power level-LCL 504. The power level-LCL 504 may represent a lower limit for a power level command 402 determined by the control command module 600 for the power control unit 214 corresponding to the respective hybrid-electric powertrain 202. Additionally, or in the alternative, the lower control limit submodule 508 may determine a lower control limit for one or more other parameters associated with the hybrid-electric powertrain 202, such as a lower control limit for a trust level and/or a lower control limit for a torque level. A lower control limit for a thrust level and/or a lower control limit for a toque level may represent a lower limit for a corresponding control command determined by the control command module 600 for such trust level or torque level corresponding to the respective hybrid-electric powertrain 202.

A power control module 400 that includes a control command module 600 may determine the power level commands 402 provided by the power control unit 214 corresponding to the respective hybrid-electric powertrain 202, for example, based at least in part on a comparison of a power level request 406 to the power level-UCL 502 and/or the power level-LCL 504. A power control module 400 that includes a control command module 600 may determine control commands corresponding to a torque level request and/or a thrust level request corresponding to the respective hybrid-electric powertrain 202, for example, based at least in part on a comparison to the respective upper and/or lower control limit.

The control limit module 500 may determine the power level-UCL 502 and/or the power level-LCL 504 based at least in part on an aggregate obverse power level request 408. Additionally, or in the alternative, the capacity allocation module 501 may determine a control limit, such as an upper control limit and/or a lower control limit based at least in part on an aggregate obverse power level request 408. The aggregate obverse power level request 408 may include or represent a sum of one or more power level requests 406 corresponding to one or more other hybrid-electric powertrain 202 electrically coupled to the energy storage system 210 and/or otherwise included in the hybrid-electric propulsion system 200. When referring to a respective hybrid-electric powertrain 202 and/or one or more features thereof, the one or more other hybrid-electric powertrains 202 electrically coupled to the energy storage system 210 and/or otherwise included in the hybrid-electric propulsion system 200 may sometimes be respectively referred to as an obverse hybrid-electric powertrain 202. For example, when referring to the first hybrid-electric powertrain 202a and/or one or more features thereof (e.g., such as when referring to the first power control unit 214a, the first power control module 400a, and/or one or more features thereof), the second hybrid-electric powertrain 202b may sometimes be referred to as an obverse hybrid-electric powertrain 202. Additionally, or in the alternative, when referring to the second hybrid-electric powertrain 202b and/or one or more features thereof (e.g., such as when referring to the second power control unit 214b, the second power control module 400b, and/or one or more features thereof), the first hybrid-electric powertrain 202a may sometimes be referred to as an obverse hybrid-electric powertrain 202. In such a manner, it will be appreciated that in this context, the term obverse refers to one or more counterpart powertrain(s) to a primary powertrain.

The one or more power level requests 406 corresponding to the one or more obverse hybrid-electric powertrain 202 (i.e., the one or more other hybrid-electric powertrain 202 included in the hybrid-electric propulsion system 200) may sometimes be respectively referred to as an obverse power level request 409. An obverse power level request 409 may include or represent a requested power level for one or more obverse hybrid-electric powertrains 202 electrically coupled to the energy storage system 210 and/or otherwise included in the hybrid-electric propulsion system 200.

For example, when referring to the first hybrid-electric powertrain 202a and/or one or more features thereof a power level requests 406 for the second hybrid-electric powertrain 202b may sometimes be referred to as a first obverse power level request 409a. The first aggregate obverse power level request 408a may include or represent a first obverse power level request 409a for one or more first obverse hybrid-electric powertrains 202 electrically coupled to the energy storage system 210 and/or otherwise included in the hybrid-electric propulsion system 200. The first obverse power level request 409a may be utilized by the first control limit module 500a to determine the first power level-UCL 502a and/or the first power level-LCL 504a for the first hybrid-electric powertrain 202a. Additionally, or in the alternative, when referring to the second hybrid-electric powertrain 202b and/or one or more features thereof, a power level requests 406 for the first hybrid-electric powertrain 202a may sometimes be referred to as a second obverse power level request 409b. The second aggregate obverse power level request 408b may include or represent a second obverse power level request 409b for one or more second obverse hybrid-electric powertrains 202 electrically coupled to the energy storage system 210 and/or otherwise included in the hybrid-electric propulsion system 200. The second obverse power level request 409b may be utilized by the second control limit module 500b to determine the second power level-UCL 502b and/or the second power level-LCL 504b for the second hybrid-electric powertrain 202b. As shown, the respective control limit modules 500 may determine the power level-UCL 502 and/or the power level-LCL 504 corresponding to the respective hybrid-electric powertrain 202 based at least in part on (n)-number of obverse power level requests 409 respectively corresponding to a respective ones of the obverse hybrid-electric powertrains 202 (i.e., the other one or more hybrid-electric powertrains 202 included in the hybrid-electric propulsion system 200). The aggregate obverse power level request 408 may include a sum of the (n)-number of obverse power level requests 409.

In some embodiments, a first control limit module 500a may determine a first power level-UCL 502a and/or a first power level-LCL 504a based at least in part on a first aggregate obverse power level request 408a. The first aggregate obverse power level request 408a may include a first obverse power level request 409a (i.e., a second power level request 406b corresponding to the second power control unit 214b of the second hybrid-electric powertrain 202b included in the hybrid-electric propulsion system 200). The first aggregate obverse power level request 408a may include a first sum of (n)-number of first obverse power level requests 409a. The first sum of (n)-number of first obverse power level requests 409a may include the first obverse power level request 409a. The first power level request 406a is not an obverse power level request 409 with respect to the first control limit module 500a, and as such, the first sum of (n)-number of first obverse power level requests 409a does not include the first power level request 406a.

In some embodiments, a second control limit module 500b may determine a second power level-UCL 502b and/or a second power level-LCL 504b based at least in part on a second aggregate obverse power level request 408b. The second aggregate obverse power level request 408b may include a second obverse power level request 409b (i.e., a first power level request 406a corresponding to the first power control unit 214a of the first hybrid-electric powertrain 202a included in the hybrid-electric propulsion system 200). The second aggregate obverse power level request 408b may include a second sum of (n)-number of second obverse power level requests 409b. The second sum of (n)-number of second obverse power level requests 409b may include the second obverse power level request 409b. The second power level request 406b is not an obverse power level request 409 with respect to the second control limit module 500b, and as such, the second sum of (n)- number of second obverse power level requests 409b does not include the second power level request 406b.

Still referring to FIG. 4, a control command module 600 corresponding to a respective power control unit 214 may determine power level commands 402 based at least in part on the more power level requests 406 corresponding to the hybrid-electric powertrain 202 corresponding to the respective power control unit 214. The power level commands 402 may be determined based additionally at least in part on the power level-UCL 502 and/or the power level-LCL 504. The control command module 600 may determine the power level commands 402 based at least in part on the more power level requests 406, and the control limit module 500 may determine the power level-UCL 502 and the power level-LCL 504 based on an aggregate obverse power level request 408 (e.g., based on one or more obverse power level requests 409).

For example, with further reference to FIG. 2A, a first power control unit 214a corresponding to a first hybrid-electric powertrain 202a may include a first control command module 600a configured to determine first power level commands 402a, and a second power control unit 214b corresponding to a second hybrid-electric powertrain 202b may include a second control command module 600b configured to determine second power level commands 402b. The first control command module 600a may determine the first power level commands 402a based at least in part on the first power level requests 406a corresponding to the first power control unit 214a of the first hybrid-electric powertrain 202a included in the hybrid-electric propulsion system 200. In addition to the first power level requests 406a, the first control command module 600a may determine the first power level commands 402a based at least in part on the first power level-UCL 502a and/or the second power level-LCL 504a. The second control command module 600b may determine the second power level commands 402b based at least in part on the second power level requests 406b corresponding to the second power control unit 214b of the second hybrid-electric powertrain 202b included in the hybrid-electric propulsion system 200. In addition to the second power level requests 406b, The second control command module 600b may determine the second power level commands 402b based at least in part on the second power level-UCL 502b and/or the second power level-LCL 504b.

The power level requests 406 may be generated by an input apparatus 220 such as a thrust lever, a power lever, an automatic throttle system, or the like. The input apparatus 220 may provide power level requests 406 corresponding to one or more of the respective hybrid-electric powertrains 202. The electronic controller 218 and/or the power control unit 214 corresponding to the respective hybrid-electric powertrain 202 may receive the power level requests 406, such as from the input apparatus 220. For example, in some embodiments, an input apparatus 220 may provide power level requests 406 corresponding to respective ones of the plurality of hybrid-electric powertrains 202. Additionally, or in the alternative, in some embodiments, a first input apparatus 220a corresponding to the first hybrid-electric powertrain 202a may provide the first power level requests 406a, such as to the first power control module 400a. A second input apparatus 220b corresponding to the second hybrid-electric powertrain 202b may provide the second power level requests 406b, such as to the second power control module 400b. The hybrid-electric propulsion system 200 may include one or more input apparatuses 220, including, for example, (n)-number of input apparatuses configured to provide power level requests 406 corresponding to the respective ones of (n)-number of hybrid-electric powertrains 202.

Figure 5A:
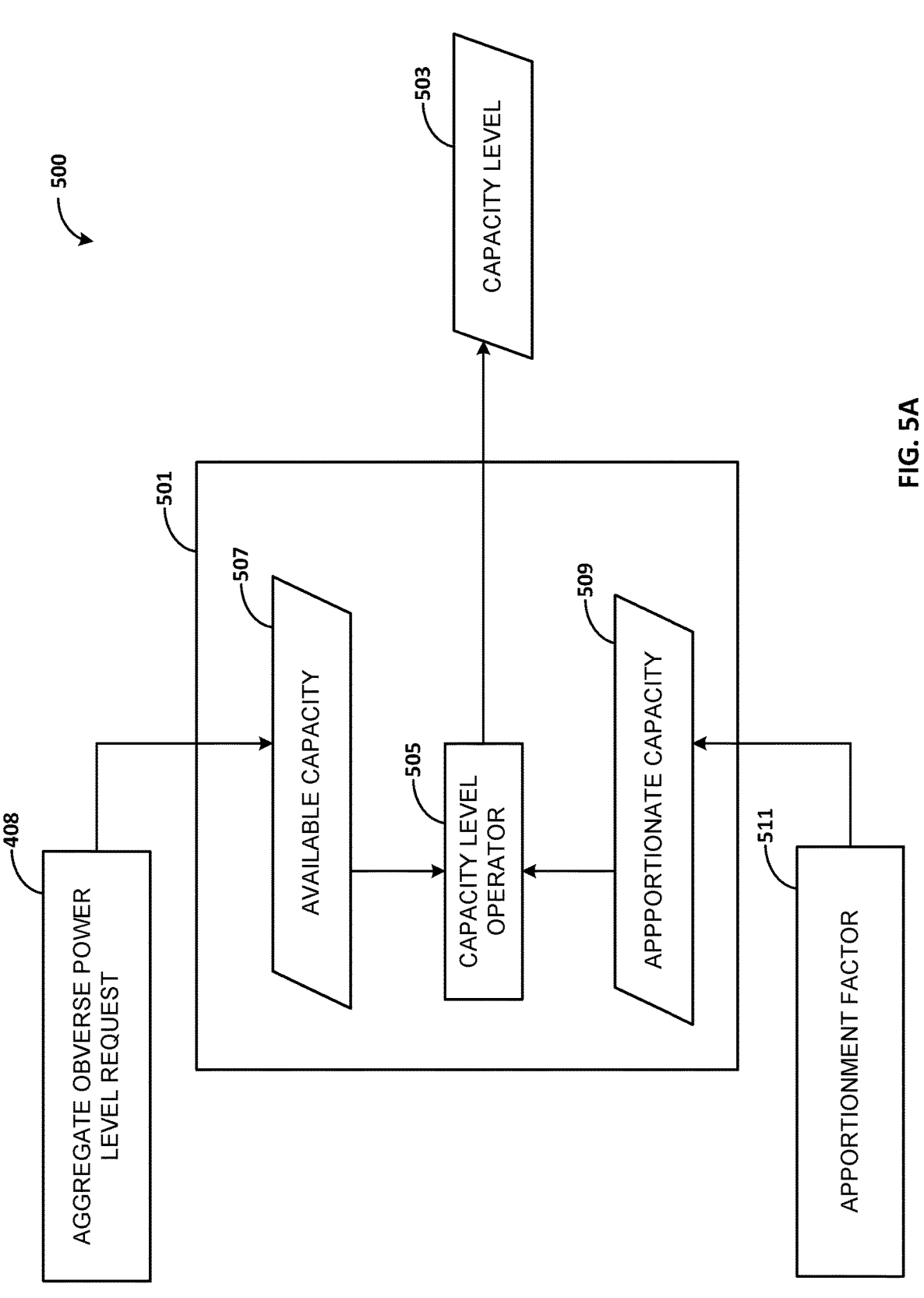
FIG. 5A schematically depicts an exemplary control limit module, that, for example, may be included in a power control module for a hybrid-electric or all-electric powertrain.
Figure 5B:
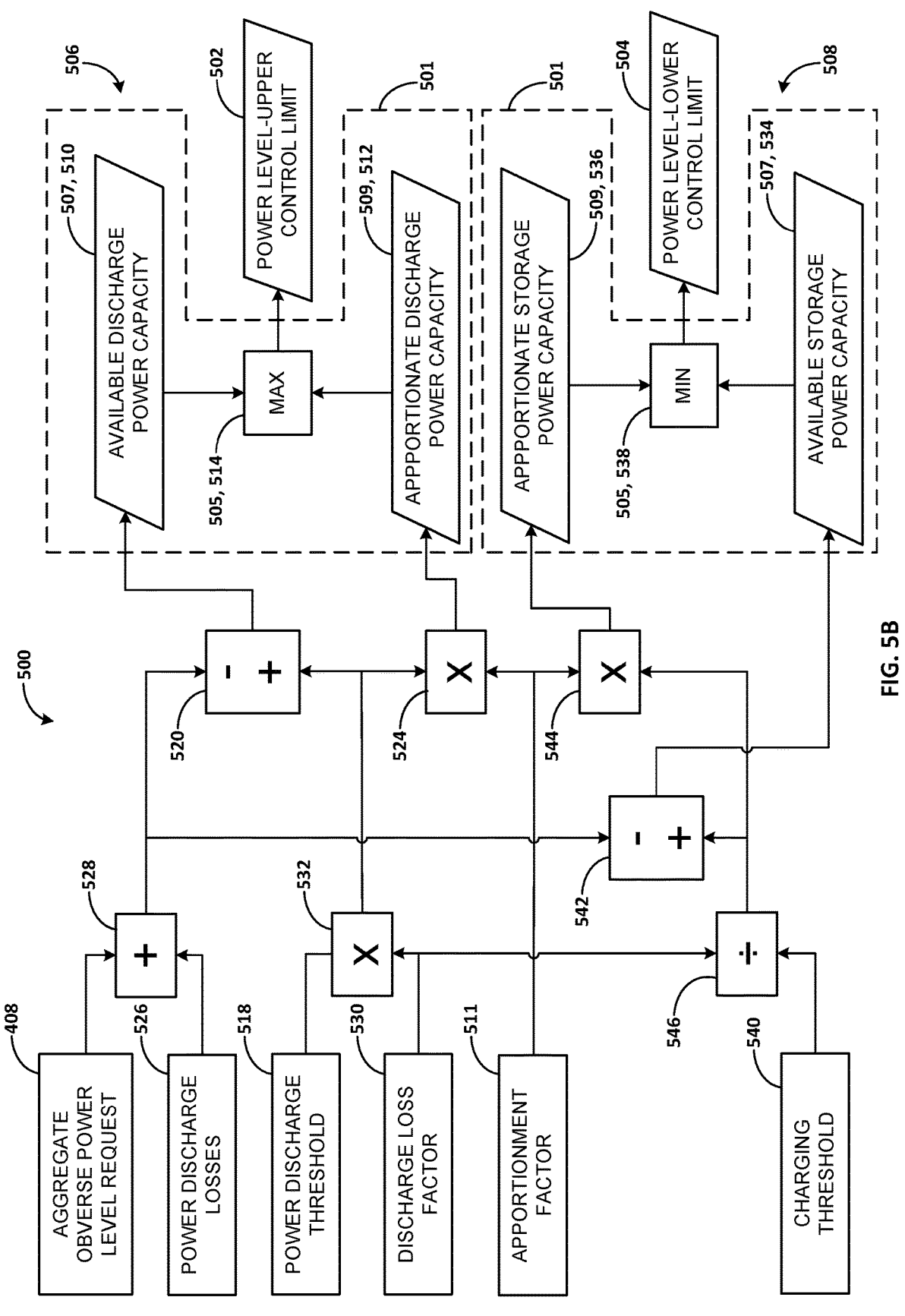
FIG. 5B schematically depicts another exemplary control limit module, that, for example, may be included in a power control module for a hybrid-electric or all-electric powertrain.

Referring now to FIGS. 5A and 5B, exemplary control limit modules 500 and capacity allocation modules 501 are further described. The control limit modules 500 and/or capacity allocation modules 501 shown in FIG. 5A and/or FIG. 5B may be included in respective ones of the plurality of power control modules 400 respectively corresponding to one of the plurality of hybrid-electric powertrains 202 and/or all-electric powertrains 260. For example, a first power control module 400*a* corresponding to the first hybrid-electric powertrain 202*a* may include a first control limit module 500*a* and/or a first capacity allocation module 501*a*, and a second power control module 400*b* corresponding to the second hybrid-electric powertrain 202*b* may include a second control limit module 500*b* and/or a second capacity allocation module 501*b*. The first control limit module 500*a* and/or the second control limit module 500*b* may be configured, for example, as shown in FIG. 5A and/or FIG. 5B. Additionally, or in the alternative, the first capacity allocation module 501*a* and/or the second capacity allocation module 501*b* may be configured, for example, as shown in FIG. 5A and/or FIG. 5B.

Referring to FIG. 5A, an exemplary control limit module 500 that includes a capacity allocation module 501 is described. As shown, a capacity allocation module 501 may determine a capacity limit 503 based at least in part on an aggregate obverse power level request 408. The capacity limit 503 may include an upper control limit and/or a lower control limit, such as a power level-UCL 502 and/or a power level-LCL 504. The capacity allocation module 501 may include a capacity level operator 505 that determines the capacity limit 503 based on an available capacity 507 or an apportionate capacity 509. The available capacity 507 may be determined based at least in part on the aggregate obverse power level 408. The apportionment capacity 509 may be determined based at least in part on an apportionment factor 511. The apportionment factor 511 may represent a factor used to determine an apportionment of the total capacity of the shared system to a respective hybrid-electric powertrain 202. The apportionment of the total capacity of the shared system may be determined proportionately or disproportionately based on the number of hybrid-electric powertrains 202 in the hybrid-electric propulsion system 200. For example, at least some of the respective control limit modules 500 corresponding to a respective hybrid-electric powertrain 202 may have an equal apportionment factor 511. Additionally, or in the alternative, at least some of the respective control limit modules 500 corresponding to a respective hybrid-electric powertrain 202 may have a respectively different apportionment factor 511. In some embodiments, the apportionment factor 511 may be determined based at least in part on a multiplicative inverse of the total number of hybrid-electric powertrains 202 electrically coupled to the energy storage system 210.

In some embodiments, the capacity level operator 505 may select between the available capacity 507 and the apportionate capacity 509. In some embodiments, the control limit operator 505 may determine the capacity limit 503 based at least in part on the larger of the available capacity 507 and the apportionate capacity 509. A capacity limit 503 determined based on larger of the available capacity 507 and the apportionate capacity 509 may be an upper control limit. Additionally, or in the alternative, in some embodiments, the control limit operator 505 may determine the capacity limit 503 based at least in part on the smaller of the available capacity 507 and the apportionate capacity 509. A capacity limit 503 determined based on the smaller of the available capacity 507 and the apportionate capacity 509 may be a lower control limit.

Referring to FIG. 5B, a control limit module 500 may include an upper control limit submodule 506 and a lower control limit submodule 508, such that the control limit module 500 may determine a power level-UCL 502 and/or a power level-LCL 504. The upper control limit submodule 506 and/or the lower control limit submodule 508 may respectively include a capacity allocation module 501. In some embodiments, the upper control limit submodule 506 and the lower control limit submodule 508 may be provided as separate modules, such as in separate control limit modules 500. Alternatively, as shown, a control limit modules 500 may include both an upper control limit submodule 506 configured to determine a power level-UCL 502, and a lower control limit submodule 508 configured to determine a power level-LCL 504.

In some embodiments, a control limit module 500 may set the power level-UCL 502 to a value equal to the available discharge power capacity 510. Additionally, or in the alternative, a control limit module 500 may set the power level-UCL 502 to a value equal to the apportionate discharge power capacity 512. In some embodiments, a control limit module 500 may determine a power level-UCL 502 based at least in part on a larger value as between an available discharge power capacity 510 and an apportionate discharge power capacity 512. The larger value as between the available discharge power capacity 510 and the apportionate discharge power capacity 512 may be determined by an upper limit-comparator operator 514 configured to determine the larger value as between the two. The upper limit-comparator operator 514 may default to either the available discharge power capacity 510 or the apportionate discharge power capacity 512 if the respective values are equal.

The available discharge power capacity 510 may include or define an amount of electrical power available for discharge after subtracting an aggregate obverse power level request 408 from a power discharge threshold 518. The aggregate obverse power level request 408 may include the total (e.g., sum) of one or more obverse power level requests 409 (FIG. 4) respectively corresponding to an obverse hybrid-electric powertrain 202. Stated differently, the available discharge power capacity 510 may include or define a difference resulting from subtracting the one or more obverse power level requests 409 from the power discharge threshold 518. The power discharge threshold 518 may include or define a threshold level for discharging electrical power from the energy storage system 210. The threshold level may correspond to a power discharge capability of the energy storage system 210, for example, when the energy storage system 210 is operating properly and/or including an operating margin selected to avoid damage to the energy storage system 210. The difference resulting from subtracting the aggregate obverse power level request 408 from the power discharge threshold 518 may be determined by an available discharge capacity-comparator operator 520 configured to determine such difference and/or to perform such subtraction operation. The available discharge capacity-comparator operator 520 may default to either the aggregate obverse power level request 408 or the power discharge threshold 518 if the respective values are equal.

The apportionate discharge power capacity 512 may include or define an apportionment of the total power discharge capability of the energy storage system 210 apportioned to a respective hybrid-electric powertrain 202. The total power discharge capability of the energy storage system 210 may be defined by the power discharge threshold 518. The apportionate discharge power capacity 512 may be determined based at least in part on an apportionment of the power discharge threshold 518 to the respective hybrid-electric powertrain 202. In some embodiments, the apportionate discharge power capacity 512 may be determined based at least in part on a multiplication product of an apportionment factor 511 and the power discharge threshold 518. The apportionment of the total power discharge capability of the energy storage system 210 to a respective hybrid-electric powertrain 202 may be determined proportionately or disproportionately based on the number of hybrid-electric powertrains 202 in the hybrid-electric propulsion system 200. For example, at least some of the respective control limit modules 500 corresponding to a respective hybrid-electric powertrain 202 may have an equal apportionment factor 511, such that the respective control limit modules 500 may determine an equal apportionate discharge power capacity 512. Additionally, or in the alternative, at least some of the respective control limit modules 500 corresponding to a respective hybrid-electric powertrain 202 may have a respectively different apportionment factor 511, such that the respective control limit modules 500 may determine a respectively different apportionate discharge power capacity 512. In some embodiments, the apportionment factor 511 may be determined based at least in part on a multiplicative inverse of the total number of hybrid-electric powertrains 202 electrically coupled to the energy storage system 210. The apportionment of the total power discharge capability of the energy storage system 210 to a respective hybrid-electric powertrain 202 may be determined by an apportionate discharge-operator 524 configured to reduce the power discharge threshold 518 by the apportionment factor 511. For example, the apportionate discharge-operator 524 may multiply the power discharge threshold 518 by the apportionment factor 511.

In some embodiments, the available discharge power capacity 510 and/or the apportionate discharge power capacity 512 may be reduced by losses across the hybrid-electric propulsion system 200 associated with discharging power from the energy storage system 210 and/or transmitting power to the respective hybrid-electric powertrains 202. Such losses may include and/or may be attributable to electrical power transmission across the hybrid-electric powertrain 202, the effect of parasitic elements (e.g., resistance, capacitance, and inductance), skin effects, resistive heating, magnetic losses caused by eddy currents, hysteresis, dielectric loss, corona discharge, and other effects. In some embodiments, power discharge losses 526 may be added to the aggregate obverse power level request 408, for example, by an addition-operator 528. Additionally, or in the alternative, the power discharge threshold 518 may be reduced by a discharge loss factor 530, for example, by a multiplication-operator 532.

Referring still to FIG. 5B, a control limit module 500 may determine a power level-LCL 504. In some embodiments, a control limit module 500 may set the power level-LCL 504 to a value equal to the available storage power capacity 534. Additionally, or in the alternative, a control limit module 500 may set the power level-LCL 504 to a value equal to the apportionate storage power capacity 536. In some embodiments, a control limit module 500 may determine a power level-LCL 504 based at least in part on a smaller value as between an available storage power capacity 534 and an apportionate storage power capacity 536. The smaller value as between the available storage power capacity 534 and the apportionate storage power capacity 536 may be determined by a lower limit-comparator operator 538 configured to determine the smaller value as between the two. The lower limit-comparator operator 538 may default to either the available storage power capacity 534 or the apportionate storage power capacity 536 if the respective values are equal.

The available storage power capacity 534 may include or define a difference resulting from subtracting the aggregate obverse power level request 408 from a charging threshold 540. Stated differently, the available storage power capacity 534 may include or define the amount of electrical power capacity available for storage after subtracting the one or more obverse power level requests 409 from the charging threshold 540. The charging threshold 540 may include or define a threshold level for supplying electrical power to the energy storage system 210. The threshold level may correspond to a charging capability of the energy storage system 210, for example, when the energy storage system 210 is operating properly and/or including an operating margin selected to avoid damage to the energy storage system 210. The difference resulting from subtracting the aggregate obverse power level request 408 from the charging threshold 540, or the subtraction of the aggregate obverse power level request 408 from the charging threshold 540, may be determined by an available storage capacity-comparator operator 542 configured to determine such difference and/or to perform such subtraction operation. The available storage capacity-comparator operator 542 may default to either the aggregate obverse power level request 408 or the charging threshold 540 if the respective values are equal.

The apportionate storage power capacity 536 may include or define an apportionment of the total charging capability of the energy storage system 210 apportioned to a respective hybrid-electric powertrain 202. The total charging capability of the energy storage system 210 may be defined by the charging threshold 540. The apportionate storage power capacity 536 may be determined based at least in part on an apportionment of the charging threshold 540 to the respective hybrid-electric powertrain 202. In some embodiments, the apportionate storage power capacity 536 may be determined based at least in part on a multiplication product of the apportionment factor 511 and the charging threshold 540. The apportionment of the total charging capability of the energy storage system 210 to a respective hybrid-electric powertrain 202 may be determined proportionately or disproportionately based on the number of hybrid-electric powertrains 202 in the hybrid-electric propulsion system 200. For example, at least some of the respective control limit modules 500 corresponding to a respective hybrid-electric powertrain 202 may have an equal apportionment factor 511, such that the respective control limit modules 500 may determine an equal apportionate storage power capacity 536. Additionally, or in the alternative, at least some of the respective control limit modules 500 corresponding to a respective hybrid-electric powertrain 202 may have a respectively different apportionment factor 511, such that the respective control limit modules 500 may determine a respectively different apportionate storage power capacity 536.

The apportionment of the total charging capability of the energy storage system 210 to a respective hybrid-electric powertrain 202 may be determined by the apportionate storage-operator 544 configured to reduce the charging threshold 540 by the apportionment factor 511. For example, the apportionate storage-operator 544 may multiply the charging threshold 540 by the apportionment factor 511. In some embodiments, the apportionment factor 511 may provide the same value for determining the apportionate storage power capacity 536 and the apportionate discharge power capacity 512 of a respective hybrid-electric powertrain 202. Additionally, or in the alternative, the apportionment factor 511 may provide respectively different values for determining the apportionate storage power capacity 536 and the apportionate discharge power capacity 512 of a respective hybrid-electric powertrain 202. In some embodiments, the available storage power capacity 534 and/or the apportionate discharge power capacity 512 may be reduced by losses and/or increased by gains across the hybrid-electric propulsion system 200 associated with supplying electrical power to the energy storage system 210 and/or transmitting power from the respective hybrid-electric powertrains 202. In some embodiments, the charging threshold 540 may be increased by a discharge loss factor 530, for example, by a division-operator 546.

Figure 6:
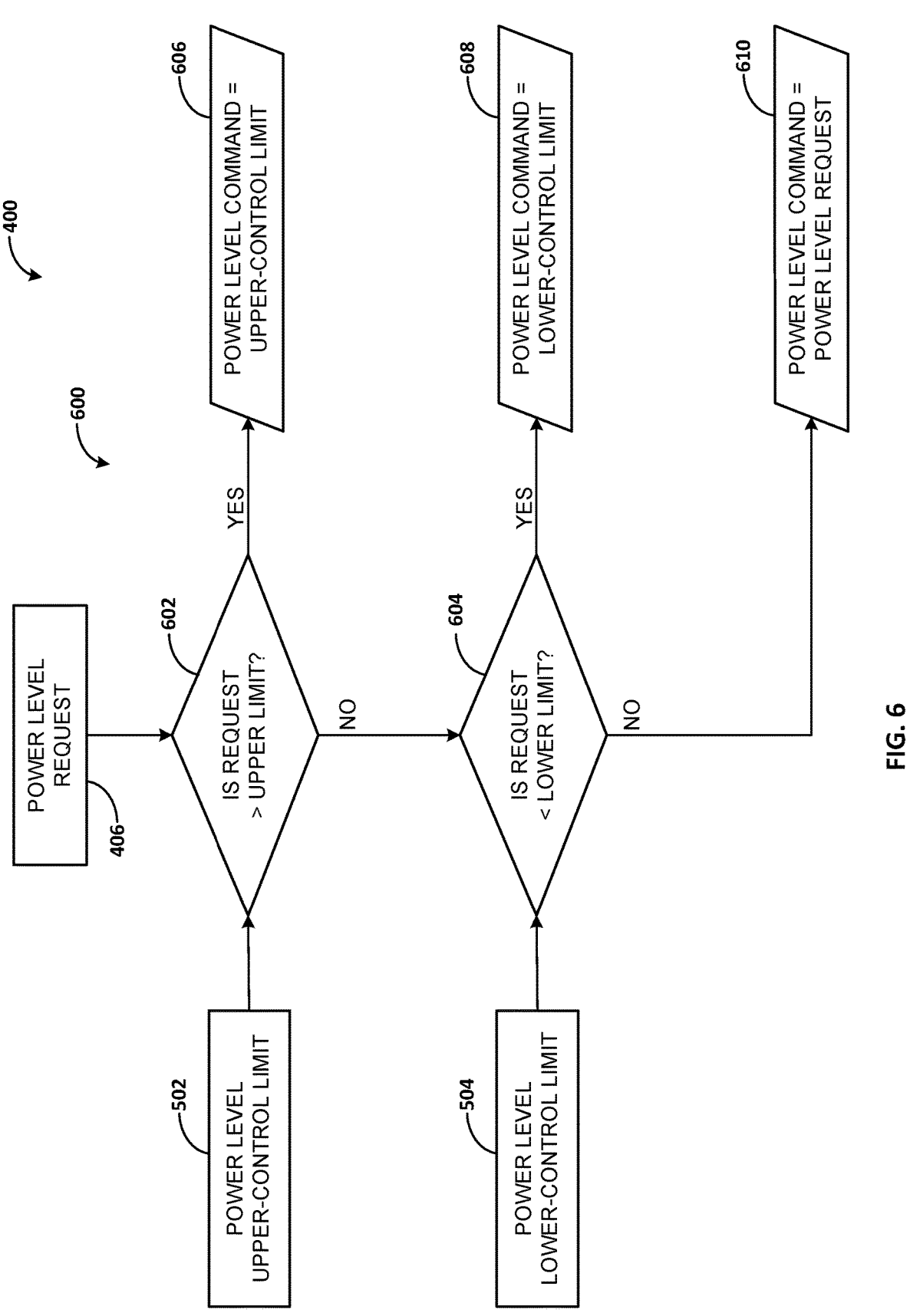
FIG. 6 schematically depicts an exemplary control command module, that, for example, may be included in a power control module for a hybrid-electric or all-electric powertrain.

Referring now to FIG. 6, exemplary control command modules 600 are further described. The control command module 600 shown in FIG. 6 may be included in respective ones of the plurality of power control modules 400 respectively corresponding to one of the plurality of hybrid-electric powertrains 202 and/or all-electric powertrains 260. For example, a first power control module 400a corresponding to the first hybrid-electric powertrain 202a may include a first control command module 600a, and a second power control module 400b corresponding to the second hybrid-electric powertrain 202b may include a second control command module 600b. The first control command module 600a and/or the second control command module 600b may be configured, for example, as shown in FIG. 6.

A control command module 600 may determine power level commands 402 that are between the power level-UCL 502 and the power level-LCL 504. The control command module 600 may set a power level command 402 equal to a power level request 406 when the power level request 406 is between the power level-UCL 502 and the power level-LCL 504. Additionally, or in the alternative, the control command module 600 may set the power level command 402 equal to the power level-UCL 502 when the power level request 406 is greater than the power level-UCL 502. Additionally, or in the alternative, the control command module 600 may set the power level command 402 equal to the power level-LCL 504 when the power level request 406 is less than the power level-LCL 504.

In some embodiments, the control command module 600 may determine whether a power level request 406 is greater than the power level-UCL 502, for example, by a comparison of the power level request 406 to the power level-UCL 502. The comparison may be performed by a power level request-upper limit comparator 602. The power level request-upper limit comparator 602 may determine whether the power level request 406 is greater than the power level-UCL 502. Additionally, or in the alternative, in some embodiments, the control command module 600 may determine whether a power level request 406 is less than the power level-LCL 504, for example, by a comparison of the power level request 406 to the power level-LCL 504. The comparison may be performed by a power level request-lower limit comparator 604. The power level request-lower limit comparator 604 may determine whether the power level request 406 is less than the power level-LCL 504.

As shown in FIG. 6, the control command module 600 may determine power level commands 402 that correspond (e.g., are equal) to the power level request 406 when the power level request 406 has a value that is between the power level-UCL 502 and the power level-LCL 504. Additionally, or in the alternative, the control command module 600 may determine power level commands 402 that correspond (e.g., are equal) to the power level-UCL 502 when the power level request 406 has a value that is greater than the power level-UCL 502. Additionally, or in the alternative, the control command module 600 may determine power level commands 402 that correspond (e.g., are equal) to the power level-LCL 504 when the power level request 406 has a value that is less than the power level-LCL 504.

By way of example, as shown in FIG. 6, the control command module 600 may determine a power level command 402 that corresponds (e.g., is equal) to the power level-UCL 502 when the power level request-upper limit comparator 602 determines that a power level request 406 is greater than the power level-UCL 502, as shown at block 606. Additionally, or in the alternative, the control command module 600 may determine a power level command 402 that corresponds (e.g., is equal) to the power level-LCL 504 when the power level request-lower limit comparator 604 determines that the power level request 406 is less than the power level-LCL 504, as shown at block 608. Additionally, or in the alternative, the control command module 600 may determine a power level command 402 that corresponds (e.g., is equal) to the power level request 406 when the power level request 406 is neither greater than the power level-UCL 502, nor less than the power level-LCL 504, as shown at block 610. The power control module 400 (FIG. 4) may output the power level command 402 determined by the control command module 600. For example, the power control module 400 (FIG. 4) may output the power level command 402 to one or more controllable components 404.

In some embodiments, the control command module 600 may simultaneously or sequentially perform the comparison of the power level request 406 to the power level-UCL 502, for example, the power level request-upper limit comparator 602, and the comparison of the power level request 406 to the power level-LCL 504, for example, the comparison may be performed by a power level request-lower limit comparator 604. A sequential comparison, of the power level request 406 to the power level-UCL 502 and the comparison of the power level request 406 to the power level-LCL 504, may be performed in any order. By way of example, as shown in FIG. 6, the control command module 600 may compare the power level request 406 to the power level-UCL 502, and when the power level request 406 is not greater than the power level-UCL 502, the control command module 600 may proceed to compare the power level request 406 to the power level-LCL 504.

Figure 7A:
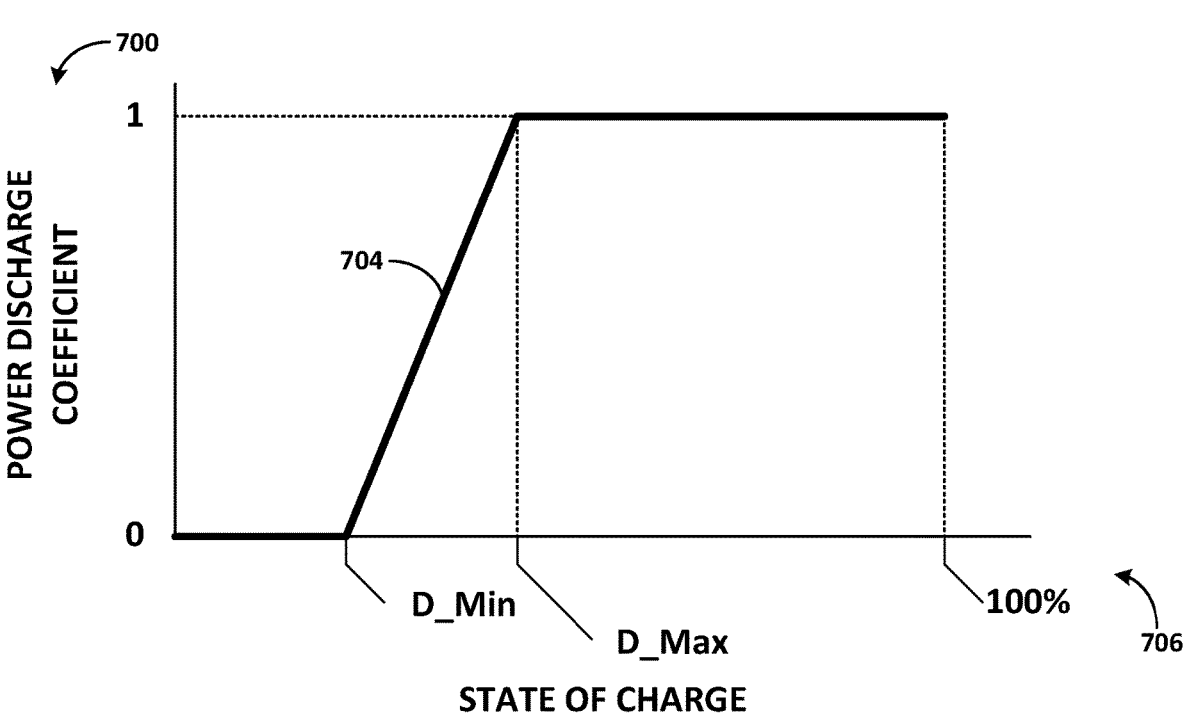
FIG. 7A shows a chart depicting an exemplary power discharge coefficient as a function of state of charge, that, for example, may be utilized by a control limit module to determine a power level-UCL.
Figure 7B:
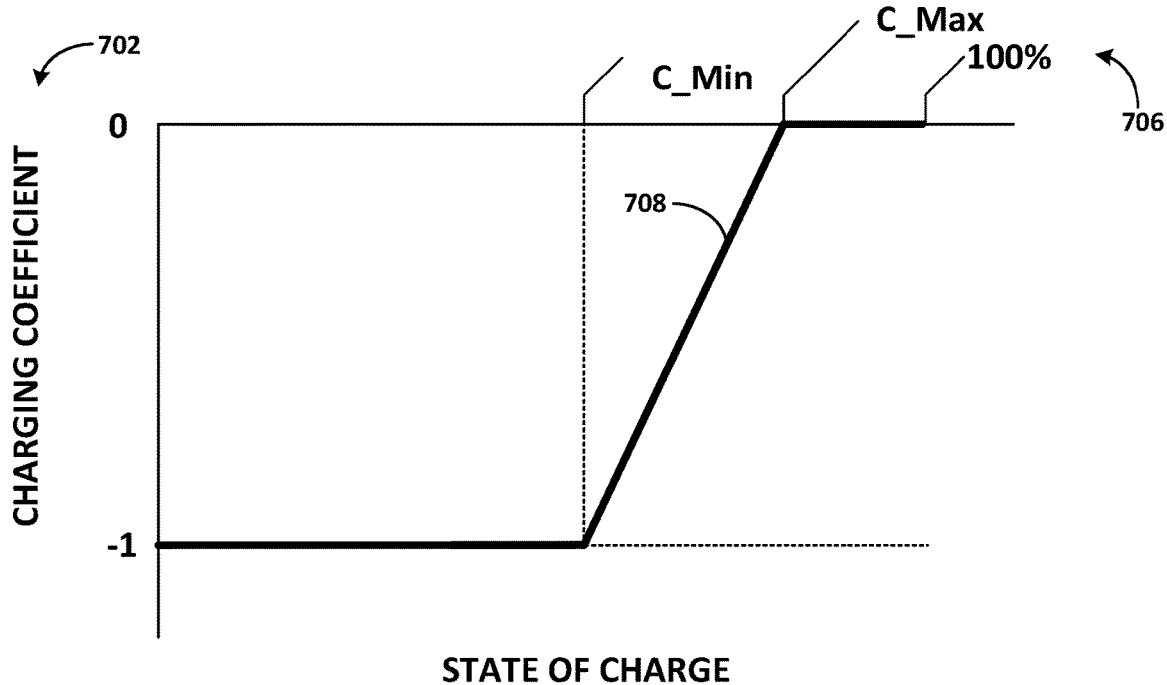
FIG. 7B shows a chart depicting an exemplary charging coefficient as a function of state of charge, that, for example, may be utilized by a control limit module to determine a power level-LCL.

Referring now to FIGS. 7A and 7B, in some embodiments, as depicted in FIG. 7A, a power discharge threshold 518 may be determined based at least in part on a power discharge coefficient 700, and/or as depicted in FIG. 7B, a charging threshold 540 may be determined based at least in part on a charging coefficient 702.

FIG. 7A shows a power discharge coefficient curve 704 that provides a power discharge coefficient 700 as a function of state of charge 706 of the energy storage system 210. The power discharge threshold 518 may reflect an adjustment based on the power discharge coefficient 700, determined, for example based on the power discharge coefficient curve 704 shown in FIG. 7A. As shown, the power discharge coefficient 700 may have a maximum value when the state of charge 706 is above an upper state of charge threshold (e.g., a state of charge corresponding to a maximum power discharge coefficient, "D_Max"). The power discharge coefficient 700 may have a minimum value when the state of charge 706 is below a lower state of charge threshold (e.g., a state of charge corresponding to a minimum power discharge coefficient, "D_Min"). The power discharge coefficient 700 may have a value between the minimum value and the maximum value when the state of charge is between the lower state of charge threshold (D_Min) and the upper state of charge threshold (D_Max). The power discharge coefficient 700 may be determined based at least in part on the power discharge coefficient curve 704, such as based at least in part on the slope of the power discharge coefficient curve 704.

In some embodiments, as shown, the power discharge coefficient 700 may have a value of 1.0 when the state of charge 706 is above an upper state of charge threshold (D_Max). Additionally, or in the alternative, the power discharge coefficient 700 may have a value of 0.0 when the state of charge 706 is below a lower state of charge threshold (D_Min). Additionally, or in the alternative, the power discharge coefficient 700 may have a value between 0.0 and 1.0 when the state of charge 706 is between the lower state of charge threshold (D_Min) and the upper state of charge threshold (D_Max). The power discharge threshold 518 may be determined based at least in part by multiplying a nominal power discharge threshold by the power discharge coefficient 700.

FIG. 7B shows a charging coefficient curve 708 that provides a charging coefficient 702 as a function of state of charge 706 of the energy storage system 210. The charging threshold 540 may reflect an adjustment based on the charging coefficient 702, determined, for example based on the charging coefficient curve 708 shown in FIG. 7B. As shown, the charging coefficient 702 may have a minimum value (e.g., a maximum negative value) when the state of charge 706 is below a lower state of charge threshold (e.g., a state of charge corresponding to a minimum charging coefficient (e.g., a maximum negative charging coefficient), "C_min"). The charging coefficient 702 may have a maximum value (e.g., a minimum negative value) when the state of charge 706 is above an upper state of charge threshold (e.g., a state of charge corresponding to a maximum charging coefficient (e.g., a minimum negative charging coefficient), "C_max"). The charging coefficient 702 may have a value between the minimum value and the maximum value when the state of charge is between the lower state of charge threshold (C_min) and the upper state of charge threshold (C_max). The charging coefficient 702 may be determined based at least in part on the charging coefficient curve 708, such as based at least in part on the slope of the charging coefficient curve 708.

In some embodiments, as shown, the charging coefficient 702 may have a value of −1.0 when the state of charge 706 is below a lower state of charge threshold (C_min). Additionally, or in the alternative, the charging coefficient 702 may have a value of 0.0 when the state of charge 706 is above an upper state of charge threshold (C_max). Additionally, or in the alternative, the charging coefficient 702 may have a value between −1.0 and 0.0 when the state of charge 706 is between the lower state of charge threshold (C_min) and the upper state of charge threshold (C_max). The charging threshold 540 may be determined based at least in part by multiplying a nominal charging threshold by the charging coefficient 702.

Figure 8A:
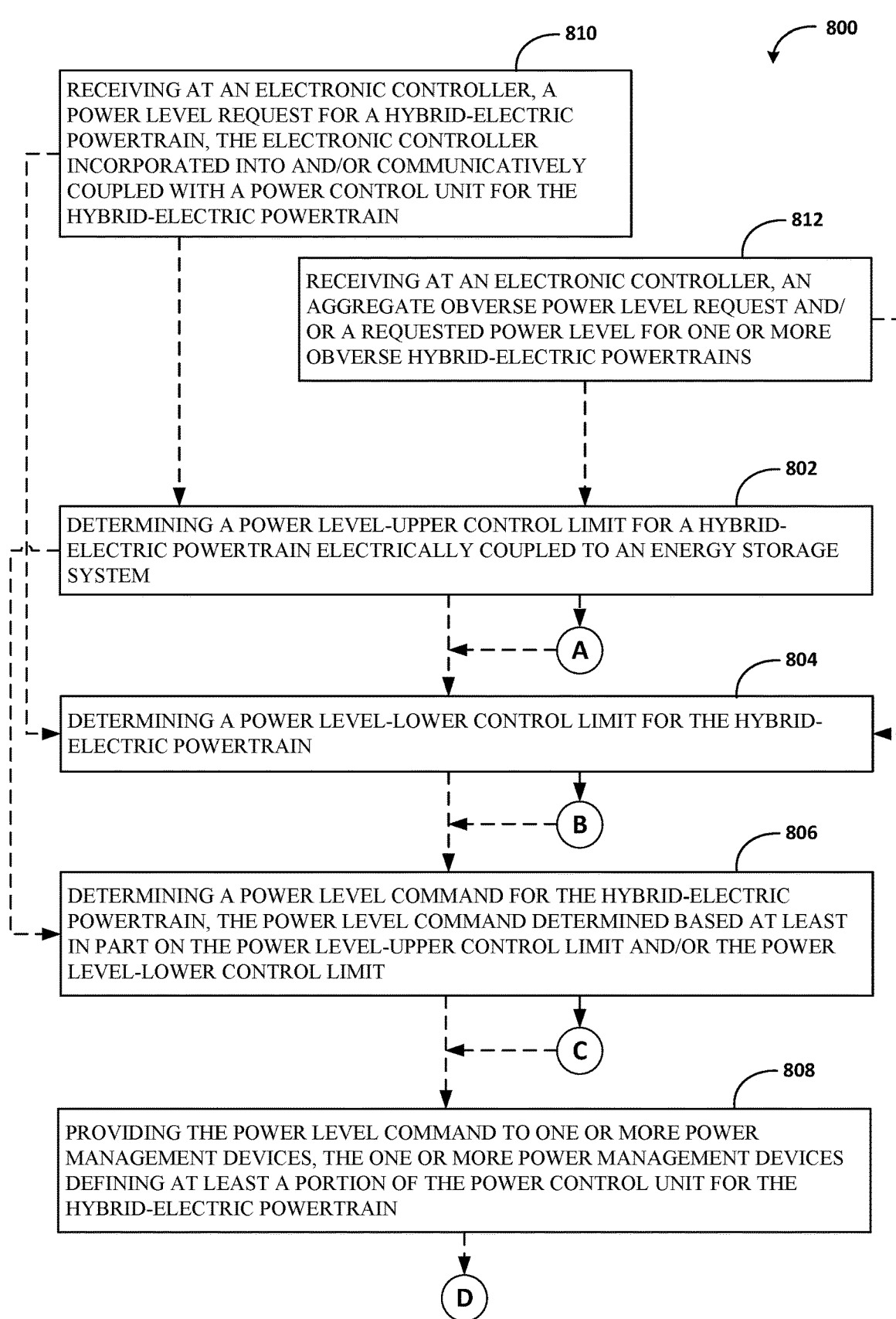

Now referring to FIGS. 8A-8D, exemplary methods are described with reference to a flowchart 800. As shown, an exemplary method may include controlling a hybrid-electric propulsion system 200, an all-electric propulsion system 262, a hybrid-electric powertrain 202, and/or an all-electric powertrain 260. As shown in FIG. 8A, an exemplary method may include, at block 802 of the flowchart 800, determining a power level-UCL for a hybrid-electric powertrain electrically coupled to an energy storage system. The power level-UCL may correspond to a difference between an aggregate obverse power level request and a power discharge threshold. At block 804, an exemplary method may include determining a power level-LCL for the hybrid-electric powertrain. The power level-LCL may correspond to a difference between an aggregate obverse power level request and a charging threshold. At block 806, an exemplary method may include determining a power level command for the hybrid-electric powertrain. The power level command may be determined based at least in part on the power level-UCL and/or the power level-LCL.

In some embodiments, an exemplary method may include, at block 808 of the flowchart 800, providing the power level command to one or more power management devices. The one or more power management devices may define at least a portion of the power control unit for the hybrid-electric powertrain. Additionally, or in the alternative, at block 810, an exemplary method may include receiving at an electronic controller, a power level request for the hybrid-electric powertrain. The electronic controller may be incorporated into and/or communicatively coupled with the power control unit for the hybrid-electric powertrain. Additionally, or in the alternative, at block 810, an exemplary method may include receiving at the electronic controller, the aggregate obverse power level request and/or the requested power level for the one or more obverse hybrid-electric powertrains.

Figure 8B:
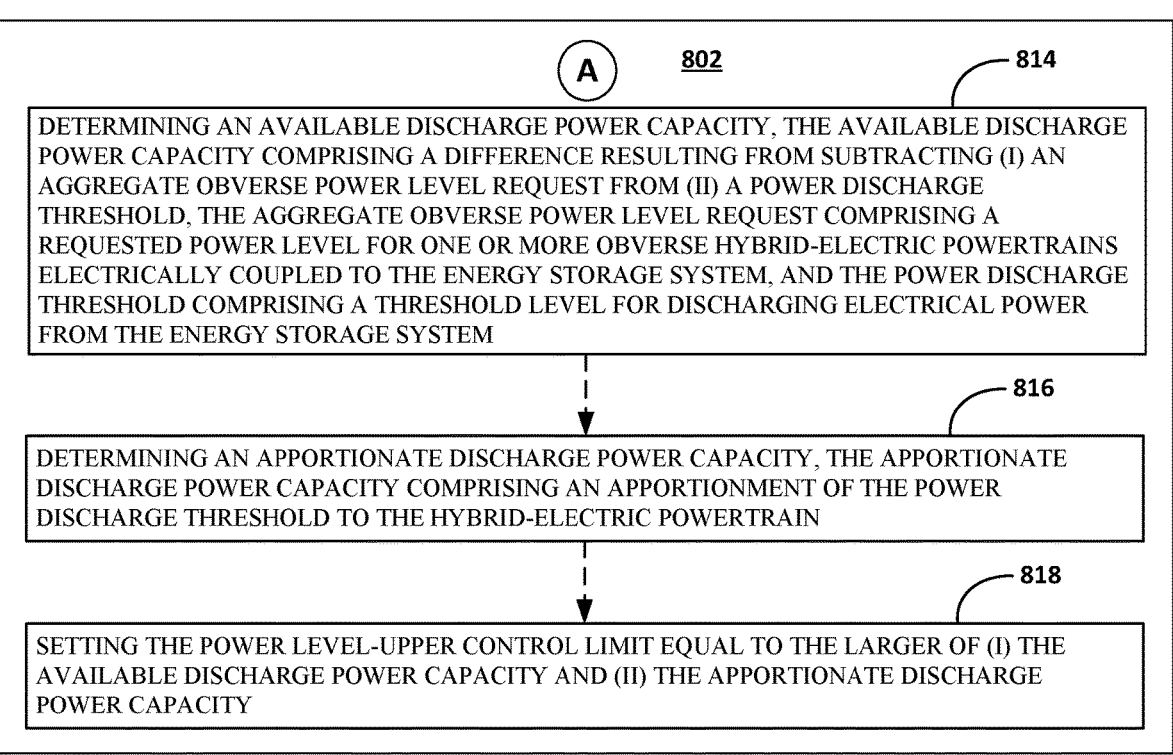

Referring to FIG. 8B, in some embodiments, determining the power level-UCL, at block 802 (FIG. 8A) may include, at block 814, determining an available discharge power capacity. The available discharge power capacity may include a difference resulting from subtracting (i) an aggregate obverse power level request from (ii) a power discharge threshold. The aggregate obverse power level request may include a requested power level for one or more obverse hybrid-electric powertrains electrically coupled to the energy storage system. The power discharge threshold may include a threshold level for discharging electrical power from the energy storage system. Additionally, or in the alternative, determining the power level-UCL, at block 802 (FIG. 8A) may include, at block 816, determining an apportionate discharge power capacity. The apportionate discharge power capacity may include an apportionment of the power discharge threshold to the hybrid-electric powertrain. Additionally, or in the alternative, determining the power level-UCL, at block 802 (FIG. 8A) may include, at block 818, setting the power level-UCL equal to either (i) the available discharge power capacity, or (ii) the apportionate discharge power capacity. For example, the power level-UCL may be set to the larger of (i) the available discharge power capacity and (ii) the apportionate discharge power capacity.

Figure 8C:
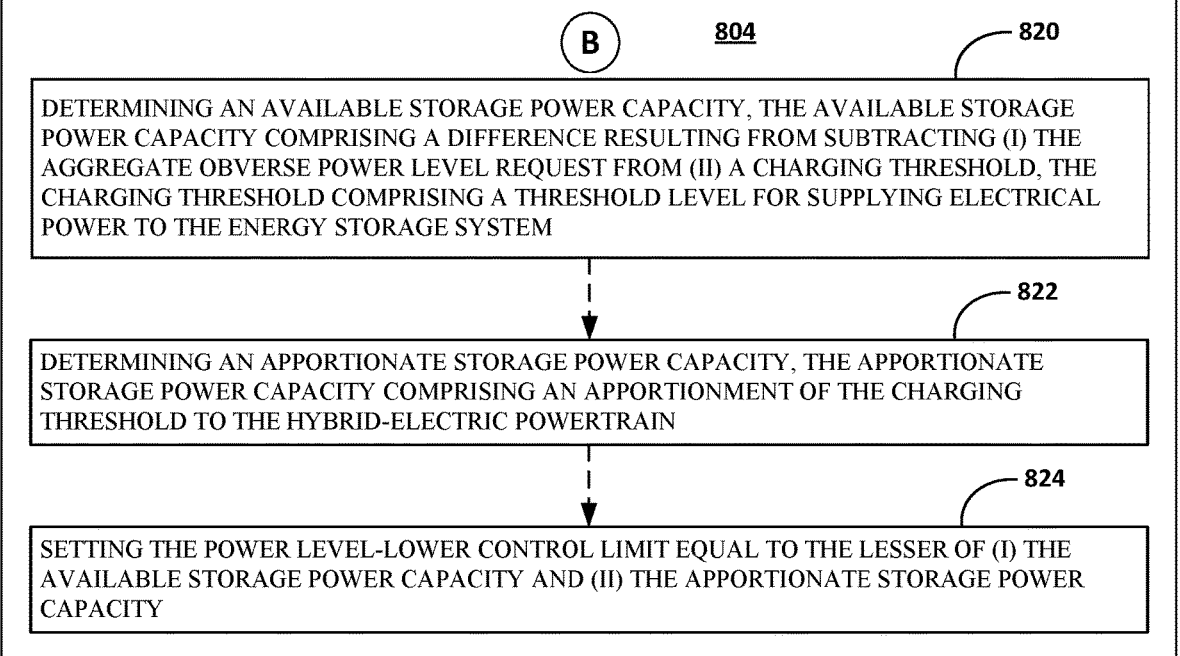

Referring to FIG. 8C, in some embodiments, determining the power level-lower control limit, at block 804 (FIG. 8A) may include, at block 820, determining an available storage power capacity. The available storage power capacity may include a difference resulting from subtracting (i) the aggregate obverse power level request from (ii) a charging threshold. The charging threshold may include a threshold level for supplying electrical power to the energy storage system. Additionally, or in the alternative, determining the power level-LCL, at block 804 (FIG. 8A) may include, at block 822, determining an apportionate storage power capacity. The apportionate storage power capacity may include an apportionment of the charging threshold to the hybrid-electric powertrain. Additionally, or in the alternative, determining the power level-LCL, at block 804 (FIG. 8A) may include, at block 824, setting the power level-LCL equal to the lesser of (i) the available storage power capacity and (ii) the apportionate storage power capacity.

Referring to FIG. 8D, in some embodiments, determining the power level command for the hybrid-electric powertrain at block 806 (FIG. 8A) may include, at block 826, limiting the power level command by the power level-UCL and/or the power level-LCL. In some embodiments, limiting the power level command by the power level-UCL and/or the power level-LCL may include, at block 828, setting the power level command equal to the power level request when the power level request is between the power level-UCL and a power level-LCL. Additionally, or in the alternative, limiting the power level command by the power level-UCL may include, at block 830, setting the power level command equal to the power level-UCL when a power level request for the hybrid-electric powertrain is greater than the power level-UCL. Additionally, or in the alternative, limiting the power level command by the power level-LCL may include, at block 832, setting the power level command equal to the power level-LCL when the power level request is less than the power level-LCL.

Referring to FIG. 8E, in some embodiments, an exemplary method may include, as shown at block 834 of the flowchart 800, generating electrical power and/or converting electrical power to mechanical power with the hybrid-electric powertrain based at least in part on the power level command. Additionally, or in the alternative, an exemplary method may include, at block 836, generating mechanical power with the hybrid-electric powertrain based at least in part on the power level command, and providing the mechanical power to one or more propulsors. Additionally, or in the alternative, an exemplary method may include, at block 838 providing electrical power from the hybrid-electric powertrain to the energy storage system based at least in part on the power level command. Additionally, or in the alternative, an exemplary method may include, at block 840 receiving electrical power from the energy storage system at the hybrid-electric powertrain based at least in part on the power level command. Additionally, or in the alternative, an exemplary method may include, at block 842 receiving electrical power from an obverse hybrid-electric powertrain based at least in part on the first power level command.

Figure 9:
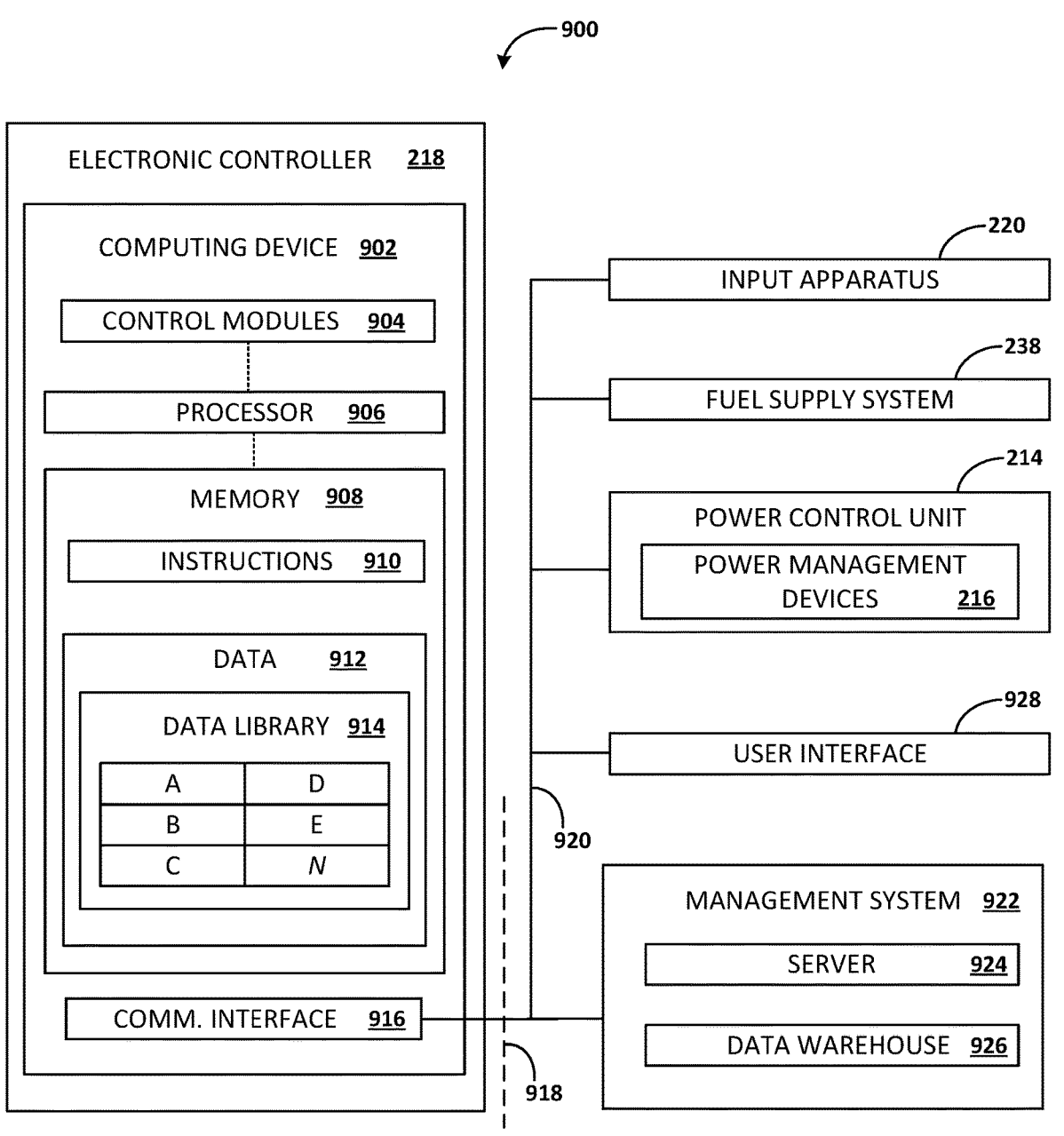
FIG. 9 schematically depicts an exemplary control system that may be utilized to control a hybrid-electric or all-electric propulsion system.

Now referring to FIG. 9, exemplary control systems 900 are described. The control system 900 may perform any desired control operations in accordance with the present disclosure. For example, the control system 900 may perform exemplary methods, such as the exemplary methods described with references to the flowchart 800 shown in FIGS. 8A-8D. As shown in FIG. 9, an exemplary control system 900 may include one or more electronic controllers 218. A respective electronic controller 218 may monitor and/or control a various operations of a respective hybrid-electric powertrain 202 and/or all-electric powertrain 260 as described herein, such as various operations of a corresponding power control unit 214 and/or power management devices 216 thereof, various operations of a corresponding fuel supply system 238.

The electronic controller 218 may include one or more computing devices 902 configured to perform specified control operations. The one or more computing devices 902 may include one or more control modules 904 configured to cause the electronic controller 218 to perform the one or more control operations, for example, based at least in part on one or more models, lookup tables, or the like. The one or more control modules 904 may include a power control module 400, a control limit module 500, and/or a control command module 600.

The one or more computing devices 902 may include one or more processors 906 and one or more memory devices 908. The one or more processors 906 may include any suitable processing device, such as a microprocessor, micro-controller, integrated circuit, logic device, and/or other suitable processing device. The one or more memory devices 908 may include one or more computer-readable media, including but not limited to non-transitory computer-readable media, RAM, ROM, hard drives, flash drives, and/or other memory devices 908. The one or more control modules 904 may be implemented at least in part by the one or more processors 906 and/or the one or more memory devices 908.

As used herein, the terms "processor" and "computer" and related terms, such as "processing device" and "computing device," are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 908 may include, but is not limited to, a non-transitory computer-readable medium, such as a random-access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 908 may store information accessible by the one or more processors 906, including computer-executable instructions 910 that can be executed by the one or more processors 906. The instructions 910 may include any set of instructions which when executed by the one or more processors 906 cause the one or more processors 906 to perform operations, including control operations. The one or more memory devices 908 may store data 912 accessible by the one or more processors 906, such as data associated with the hybrid-electric propulsion system 200, the respective hybrid-electric powertrain 202, the one or more control modules 904, and/or the electronic controller 218 associated therewith. The data 912 may include current or real-time data 912, past data 912, or a combination thereof. The data 912 may be stored in a data library 914. The data 912 may also include other data sets, parameters, outputs, information, associated with the hybrid-electric propulsion system 200, the respective hybrid-electric powertrain 202, the one or more control modules 904, and/or the electronic controller 218 associated therewith.

The one or more computing devices 902 may also include a communication interface 916 configured to communicate with various nodes on a communication network 918 via wired or wireless communication lines 920. The communication interface 916 may include any suitable components for interfacing with one or more network(s), including for example, transmitters, receivers, ports, controllers, antennas, and/or other suitable components. The communication network 918 may include, for example, a local area network (LAN), a wide area network (WAN), SATCOM network, VHF network, a HF network, a Wi-Fi network, a WiMAX network, a gatelink network, and/or any other suitable communication network 918 for transmitting messages to and/or from the computing device 902 across the communication lines 920. The communication lines 920 of communication network 918 may include a data bus or a combination of wired and/or wireless communication links.

The one or more electronic controllers 218 may be communicatively coupled, for example, by way of the communication network 918, with one or more components of the hybrid-electric propulsion system 200 and/or the respective hybrid-electric powertrain 202 with respect to which the one or more electronic controllers 218 may communicate. For example, an electronic controller 218 may be communicatively coupled with a corresponding power control unit 214 and/or respective power management devices 216 thereof. Additionally, or in the alternative, the electronic controller 218 may be communicatively coupled with a corresponding input apparatus 220. Additionally, or in the alternative, the electronic controller 218 may be communicatively coupled with a corresponding fuel supply system 238, such as one or more fuel valves or other controllable components thereof.

The control system 900 may include a management system 922 located locally or remotely relative to the hybrid-electric propulsion system 200 and/or relative to an aircraft 100 powered by the hybrid-electric propulsion system 200. The management system 922 may include a server 924 and/or a data warehouse 926. As an example, at least a portion of the data 912 may be stored in the data warehouse 926, and the server 924 may transmit data 912 from the data warehouse 926 to the one or more electronic controllers 218, and/or to receive data 912 from the one or more electronic controllers 218 and to store the received data 912 in the data warehouse 926 for further purposes. The server 924 and/or the data warehouse 926 may be implemented as part of the one or more electronic controllers 218 and/or as part of the management system 922. The control system 900 may also include a user interface 928 configured to allow a user to interact with the various features of the control system 900, for example, by way of the communication interface 916. The communication interface 916 may allow the one or more computing devices 902 to communicate with various nodes associated with the aircraft 100, the hybrid-electric propulsion system 200, the management system 922, and/or the user interface 928.

Further aspects are provided by the subject matter of the following clauses:

A power control unit for a hybrid-electric or all-electric propulsion system of an aircraft, the power control unit comprising: a power control unit, the power control unit electrically coupling the electric machine to the energy storage system; wherein the power control unit comprises an electronic controller, the electronic controller comprising a non-transitory computer-readable medium comprising computer-executable instructions, which when executed by a processor associated with the electronic controller, cause the power control unit to perform a method comprising: determining a power level-upper control limit (power level-UCL) for the power control unit, wherein the power level-UCL corresponds to a difference between an aggregate obverse power level request and a power discharge threshold; and determining a power level command for the power control unit, the power level command determined based at least in part on the power level-UCL, wherein determining the power level command for the power control unit comprises limiting the power level command by the power level-UCL.

The power control unit of any preceding clause, wherein determining the power level-UCL comprises: determining an available discharge power capacity, the available discharge power capacity comprising a difference resulting from subtracting (i) the aggregate obverse power level request from (ii) the power discharge threshold, the aggregate obverse power level request comprising a requested power level for one or more obverse hybrid-electric powertrains electrically coupled to the energy storage system, and the power discharge threshold comprising a threshold level for discharging electrical power from the energy storage system; and setting the power level-UCL equal to the available discharge power capacity.

The power control unit of any preceding clause, wherein the power control unit comprises one or more power management devices.

The power control unit of any preceding clause, wherein the one or more power management devices comprise at least one of: an inverter, a converter, a rectifier, a synchronous converter, a synchronous buck converter, a bidirectional interleave converter, an autotransformer rectifier, or a matrix converter.

A hybrid-electric or all-electric powertrain for an aircraft, the powertrain comprising: an electric machine; an energy storage system; and a power control unit, the power control unit electrically coupling the electric machine to the energy storage system; wherein the power control unit comprises an electronic controller, the electronic controller comprising a non-transitory computer-readable medium comprising computer-executable instructions, which when executed by a processor associated with the electronic controller, cause the power control unit to perform a method comprising: determining a power level-upper control limit (power level-UCL) for the power control unit, wherein the power level-UCL corresponds to a difference between an aggregate obverse power level request and a power discharge threshold; and determining a power level command for the power control unit, the power level command determined based at least in part on the power level-UCL, wherein determining the power level command for the power control unit comprises limiting the power level command by the power level-UCL.

The hybrid-electric or all-electric powertrain of any preceding clause, wherein determining the power level-UCL comprises: determining an available discharge power capacity, the available discharge power capacity comprising a difference resulting from subtracting (i) the aggregate obverse power level request from (ii) the power discharge threshold, the aggregate obverse power level request comprising a requested power level for one or more obverse hybrid-electric powertrains electrically coupled to the energy storage system, and the power discharge threshold comprising a threshold level for discharging electrical power from the energy storage system; and setting the power level-UCL equal to the available discharge power capacity.

The hybrid-electric or all-electric powertrain of any preceding clause, wherein the hybrid-electric powertrain comprises a series configuration, a parallel configuration, or a series-parallel configuration.

The hybrid-electric or all-electric powertrain of any preceding clause, comprising: a combustion engine.

The hybrid-electric powertrain of any preceding clause, wherein the combustion engine comprises a gas turbine engine.

The hybrid-electric or all-electric powertrain of any preceding clause, comprising: one or more propulsors configured to receive mechanical power from the combustion engine and the electric machine, individually or simultaneously.

The hybrid-electric or all-electric powertrain of any preceding clause, wherein the hybrid-electric powertrain, the one or more obverse hybrid-electric powertrains, and the energy storage system are electrically coupled to a distribution bus.

The hybrid-electric or all-electric powertrain of any preceding clause, wherein the power control unit comprises one or more power management devices, the one or more power management devices comprising at least one of: an inverter, a converter, a rectifier, a synchronous converter, a synchronous buck converter, a bidirectional interleave converter, an autotransformer rectifier, or a matrix converter.

The hybrid-electric or all-electric powertrain of any preceding clause, wherein the requested power level for the one or more obverse hybrid-electric powertrains is provided by an input apparatus, the input apparatus comprising at least one of: a thrust lever, a power lever, or an automatic throttle system.

The hybrid-electric powertrain of any preceding clause, wherein the hybrid-electric powertrain includes the power control unit of any preceding clause.

A hybrid-electric or all-electric propulsion system for an aircraft, The hybrid-electric or all-electric propulsion system comprising: a first hybrid-electric powertrain; a second hybrid-electric powertrain; and an energy storage system electrically coupled to the first hybrid-electric powertrain and the second hybrid-electric powertrain; wherein the first hybrid-electric powertrain comprises: a first electric machine, and a first power control unit, the first power control unit electrically coupling the first electric machine to the energy storage system; wherein the first power control unit comprises a first electronic controller, the first electronic controller comprising a first non-transitory computer-readable medium comprising first computer-executable instructions, which when executed by a first processor associated with the first electronic controller, cause the first power control unit to perform a first method of controlling the first hybrid-electric or all-electric propulsion system.

The hybrid-electric or all-electric propulsion system of any preceding clause, wherein the first method comprises: determining a first power level-UCL for a first hybrid-electric powertrain, the first hybrid-electric powertrain electrically coupled to an energy storage system; and determining a first power level command for the first hybrid-electric powertrain, the first power level command determined based at least in part on the first power level-UCL.

The hybrid-electric or all-electric propulsion system of any preceding clause, wherein the first method comprises: determining a first power level-LCL for the first hybrid-electric powertrain, and determining the first power level command for the first hybrid-electric powertrain based at least in part on the first power level-LCL.

The hybrid-electric or all-electric propulsion system of any preceding clause, wherein the first power level-UCL corresponds to a difference between a first aggregate obverse power level request and a power discharge threshold.

The hybrid-electric or all-electric propulsion system of any preceding clause, wherein determining the first power level command for the first hybrid-electric powertrain comprises limiting the first power level command by the first power level-UCL.

The hybrid-electric or all-electric propulsion system of any preceding clause, wherein determining the first power level-UCL comprises: determining a first available discharge power capacity at least in part by subtracting (i) a first aggregate obverse power level request from (ii) a power discharge threshold, the first aggregate obverse power level request comprising a first requested power level for one or more first obverse hybrid-electric powertrains electrically coupled to the energy storage system, and the power discharge threshold comprising a threshold level for discharging electrical power from the energy storage system.

The hybrid-electric or all-electric propulsion system of any preceding clause, wherein determining the first power level-UCL comprises: determining a first apportionate discharge power capacity, the first apportionate discharge power capacity comprising a first apportionment of the power discharge threshold to first the hybrid-electric powertrain.

The hybrid-electric or all-electric propulsion system of any preceding clause, wherein the first method comprises: setting the first power level-UCL equal to the larger of (i) the available discharge power capacity and (ii) the first apportionate discharge power capacity.

The hybrid-electric or all-electric propulsion system of any preceding clause, wherein the first power level-LCL corresponds to a difference between the first aggregate obverse power level request and a charging threshold.

The hybrid-electric or all-electric propulsion system of any preceding clause, wherein determining the first power level command for the first hybrid-electric powertrain comprises limiting the first power level command by the first power level-LCL.

The hybrid-electric or all-electric propulsion system of any preceding clause, wherein determining the first power level-LCL comprises: determining a first available storage power capacity at least in part by subtracting (i) the first aggregate obverse power level request from (ii) the charging threshold, the charging threshold comprising a threshold level for supplying electrical power to the energy storage system.

The hybrid-electric or all-electric propulsion system of any preceding clause, wherein determining the first power level-LCL comprises: determining a first apportionate storage power capacity, the first apportionate storage power capacity comprising a first apportionment of the charging threshold to the first hybrid-electric powertrain.

The hybrid-electric or all-electric propulsion system of any preceding clause, wherein determining the first power level-LCL comprises: setting the first power level-LCL equal to the lesser of (i) the available storage power capacity and (ii) the first apportionate storage power capacity.

The hybrid-electric or all-electric propulsion system of any preceding clause, wherein determining the first power level command for the first hybrid-electric powertrain comprises limiting the first power level command by the first power level-UCL and the first power level-LCL.

The hybrid-electric or all-electric propulsion system of any preceding clause, wherein the second hybrid-electric powertrain comprises: a second electric machine, and a second power control unit, the second power control unit electrically coupling the second electric machine to the energy storage system;

The hybrid-electric or all-electric propulsion system of any preceding clause, wherein the second power control unit comprises a second electronic controller, the second electronic controller comprising a second non-transitory computer-readable medium comprising second computer-executable instructions, which when executed by a second processor associated with the second electronic controller, cause the second power control unit to perform a second method of controlling the second hybrid-electric or all-electric propulsion system;

The hybrid-electric or all-electric propulsion system of any preceding clause, wherein the second method comprises: determining a second power level-UCL for a second hybrid-electric powertrain, the second hybrid-electric powertrain electrically coupled to the energy storage system; and determining a second power level command for the second hybrid-electric powertrain, the second power level command determined based at least in part on the second power level-UCL.

The hybrid-electric or all-electric propulsion system of any preceding clause, wherein the second method comprises: determining a second power level-LCL for the second hybrid-electric powertrain, and determining the second power level command for the second hybrid-electric powertrain based at least in part on the second power level-LCL.

The hybrid-electric or all-electric propulsion system of any preceding clause, wherein the second power level-UCL corresponds to a difference between a second aggregate obverse power level request and a power discharge threshold.

The hybrid-electric or all-electric propulsion system of any preceding clause, wherein determining the second power level command for the second hybrid-electric powertrain comprises limiting the second power level command by the second power level-UCL.

The hybrid-electric or all-electric propulsion system of any preceding clause, wherein determining the second power level-UCL comprises: determining a second available discharge power capacity at least in part by subtracting (i) a second aggregate obverse power level request from (ii) a power discharge threshold, the second aggregate obverse power level request comprising a second requested power level for one or more second obverse hybrid-electric powertrains electrically coupled to the energy storage system, and the power discharge threshold comprising a threshold level for discharging electrical power from the energy storage system.

The hybrid-electric or all-electric propulsion system of any preceding clause, wherein determining the second power level-UCL comprises: determining a second apportionate discharge power capacity, the second apportionate discharge power capacity comprising a second apportionment of the power discharge threshold to second the hybrid-electric powertrain.

The hybrid-electric or all-electric propulsion system of any preceding clause, wherein the second method comprises: setting the second power level-UCL equal to the larger of (i) the available discharge power capacity and (ii) the second apportionate discharge power capacity.

The hybrid-electric or all-electric propulsion system of any preceding clause, wherein the second power level-LCL corresponds to a difference between the second aggregate obverse power level request and a charging threshold.

The hybrid-electric or all-electric propulsion system of any preceding clause, wherein determining the second power level command for the second hybrid-electric powertrain comprises limiting the second power level command by the second power level-LCL.

The hybrid-electric or all-electric propulsion system of any preceding clause, wherein determining the second power level-LCL comprises: determining a second available storage power capacity at least in part by subtracting (i) the second aggregate obverse power level request from (ii) the charging threshold, the charging threshold comprising a threshold level for supplying electrical power to the energy storage system.

The hybrid-electric or all-electric propulsion system of any preceding clause, wherein determining the second power level-LCL comprises: determining a second apportionate storage power capacity, the second apportionate storage power capacity comprising a second apportionment of the charging threshold to the second hybrid-electric powertrain.

The hybrid-electric or all-electric propulsion system of any preceding clause, wherein the second method comprises: setting the second power level-LCL equal to the lesser of (i) the available storage power capacity and (ii) the second apportionate storage power capacity.

The hybrid-electric or all-electric propulsion system of any preceding clause, wherein determining the second power level command for the second hybrid-electric powertrain comprises limiting the second power level command by the second power level-UCL and the second power level-LCL.

The hybrid-electric or all-electric propulsion system of any preceding clause, wherein the first hybrid-electric powertrain comprises: a first combustion engine, and/or wherein the second hybrid-electric powertrain comprises: a second combustion engine.

The hybrid-electric or all-electric propulsion system of any preceding clause, wherein the hybrid-electric or all-electric propulsion system includes the hybrid-electric powertrain of any preceding clause.

A method of controlling a hybrid-electric or all-electric powertrain of an aircraft, the method comprising: determining a capacity level for a hybrid-electric powertrain, the hybrid-electric powertrain electrically coupled to an energy storage system; and determining a control command for the hybrid-electric powertrain, the control command determined based at least in part on the capacity level; wherein the capacity level is determined based at least in part on a selection between an available capacity and an apportionate capacity; and wherein determining the control command for the hybrid-electric powertrain comprises limiting the control command by the capacity level.

The method of any preceding clause, wherein the available capacity is determined based at least in part on an aggregate obverse power level request.

The method of any preceding clause, wherein the apportionate capacity is determined based at least in part on an apportionment factor.

The method of any preceding clause, wherein the apportionate capacity is determined based at least in part on a multiplication product of the apportionment factor and a power discharge threshold or a charging threshold.

A method of controlling a hybrid-electric or all-electric powertrain of an aircraft, the method comprising: determining a power level-upper control limit (power level-UCL) for a hybrid-electric powertrain, the hybrid-electric powertrain electrically coupled to an energy storage system; and determining a power level command for the hybrid-electric powertrain, the power level command determined based at least in part on the power level-UCL; wherein the power level-UCL corresponds to a difference between an aggregate obverse power level request and a power discharge threshold; and wherein determining the power level command for the hybrid-electric powertrain comprises limiting the power level command by the power level-UCL.

The method of any preceding clause, wherein determining the power level-UCL comprises: determining an available discharge power capacity, the available discharge power capacity comprising a difference resulting from subtracting (i) an aggregate obverse power level request from (ii) a power discharge threshold, the aggregate obverse power level request comprising a requested power level for one or more obverse hybrid-electric powertrains electrically coupled to the energy storage system, and the power discharge threshold comprising a threshold level for discharging electrical power from the energy storage system; and setting the power level-UCL equal to the available discharge power capacity.

The method of any preceding clause, wherein limiting the power level command by the power level-UCL comprises: setting the power level command equal to the power level-UCL when a power level request for the hybrid-electric powertrain is greater than the power level-UCL.

The method of any preceding clause, limiting the power level command by the power level-UCL comprises: setting the power level command equal to the power level request when the power level request is between the power level-UCL and a power level-LCL, and setting the power level command equal to the power level-LCL when the power level request is less than the power level-LCL.

The method of any preceding clause, comprising: receiving at an electronic controller, a power level request for the hybrid-electric powertrain, the electronic controller incorporated into and/or communicatively coupled with a power control unit for the hybrid-electric powertrain.

The method of any preceding clause, comprising: receiving at the electronic controller, the aggregate obverse power level request and/or the requested power level for the one or more obverse hybrid-electric powertrains.

The method of any preceding clause, comprising: providing the power level command to one or more power management devices, the one or more power management devices defining at least a portion of the power control unit for the hybrid-electric powertrain.

The method of any preceding clause, wherein determining the power level-UCL comprises: determining an apportionate discharge power capacity, the apportionate discharge power capacity comprising an apportionment of the power discharge threshold to the hybrid-electric powertrain; wherein setting the power level-UCL equal to the available discharge power capacity comprises: setting the power level-UCL equal to either (i) the available discharge power capacity or (ii) the apportionate discharge power capacity.

The method of any preceding clause, comprising: setting the power level-UCL equal to either (i) the available discharge power capacity or (ii) the apportionate discharge power capacity using a capacity level operator.

The method of any preceding clause, wherein determining the power level-UCL comprises: determining an apportionate discharge power capacity, the apportionate discharge power capacity comprising an apportionment of the power discharge threshold to the hybrid-electric powertrain; wherein setting the power level-UCL equal to the available discharge power capacity comprises: setting the power level-UCL equal to the larger of (i) the available discharge power capacity and (ii) the apportionate discharge power capacity.

The method of any preceding clause, wherein the apportionment of the power discharge threshold to the hybrid-electric powertrain comprises applying an apportionment factor to the power discharge threshold.

The method of any preceding clause, wherein the apportionment of the power discharge threshold to the hybrid-electric powertrain comprises a multiplication product of (i) an apportionment factor and (ii) the power discharge threshold.

The method of any preceding clause, wherein the apportionment factor comprises a multiplicative inverse of a total number of the one or more obverse hybrid-electric powertrains.

The method of any preceding clause, comprising: determining a power level-lower control limit (power level-LCL) for the hybrid-electric powertrain, wherein determining the power level-LCL comprises: determining an available storage power capacity, the available storage power capacity comprising a difference resulting from subtracting (i) the aggregate obverse power level request from (ii) a charging threshold, the charging threshold comprising a threshold level for supplying electrical power to the energy storage system, and setting the power level-LCL equal to the available storage power capacity; wherein determining the power level command for the hybrid-electric powertrain comprises limiting the power level command by the power level-LCL.

The method of any preceding clause, wherein determining the power level-upper control limit comprises: determining an apportionate storage power capacity, the apportionate storage power capacity comprising an apportionment of the charging threshold to the hybrid-electric powertrain; wherein setting the power level-LCL equal to the available storage power capacity comprises: setting the power level-LCL equal to either (i) the available storage power capacity or (ii) the apportionate storage power capacity.

The method of any preceding clause, comprising: setting the power level-LCL equal to either (i) the available storage power capacity or (ii) the apportionate storage power capacity using a capacity level operator.

The method of any preceding clause, wherein determining the power level-upper control limit comprises: determining an apportionate storage power capacity, the apportionate storage power capacity comprising an apportionment of the charging threshold to the hybrid-electric powertrain; wherein setting the power level-LCL equal to the available storage power capacity comprises: setting the power level-LCL equal to the lesser of (i) the available storage power capacity and (ii) the apportionate storage power capacity.

The method of any preceding clause, wherein the apportionment of the charging threshold to the hybrid-electric powertrain comprises a multiplication product of (i) an apportionment factor and (ii) the charging threshold.

The method of any preceding clause, wherein the apportionment factor comprises a multiplicative inverse of a total number of the one or more obverse hybrid-electric powertrains.

The method of any preceding clause, comprising: determining a power level-LCL for the hybrid-electric powertrain, wherein determining the power level-LCL comprises: determining an available storage power capacity, the available storage power capacity comprising a difference resulting from subtracting (i) the aggregate obverse power level request from (ii) a charging threshold, the charging threshold comprising a threshold level for supplying electrical power to the energy storage system, and setting the power level-LCL equal to the available storage power capacity; wherein determining the power level command for the hybrid-electric powertrain comprises limiting the power level command by the power level-LCL.

The method of any preceding clause, wherein determining the power level-upper control limit comprises: determining an apportionate storage power capacity, the apportionate storage power capacity comprising an apportionment of the charging threshold to the hybrid-electric powertrain; wherein setting the power level-LCL equal to the available storage power capacity comprises: setting the power level-LCL equal to the lesser of (i) the available storage power capacity and (ii) the apportionate storage power capacity.

The method of any preceding clause, wherein the apportionment of the charging threshold to the hybrid-electric powertrain comprises a multiplication product of (i) an apportionment factor and (ii) the charging threshold.

A method of controlling a hybrid-electric or all-electric propulsion system for an aircraft, the method comprising: determining a first power level-UCL and a first power level-LCL for a first hybrid-electric powertrain, the first hybrid-electric powertrain electrically coupled to an energy storage system; and determining a first power level command for the first hybrid-electric powertrain, the first power level command determined based at least in part on the first power level-UCL and the first power level-LCL; wherein determining the first power level-UCL comprises: determining a first available discharge power capacity at least in part by subtracting (i) a first aggregate obverse power level request from (ii) a power discharge threshold, the first aggregate obverse power level request comprising a first requested power level for one or more first obverse hybrid-electric powertrains electrically coupled to the energy storage system, and the power discharge threshold comprising a threshold level for discharging electrical power from the energy storage system, and setting the first power level-UCL equal to the available discharge power capacity; wherein determining the first power level-LCL comprises: determining a first available storage power capacity at least in part by subtracting (i) the first aggregate obverse power level request from (ii) the charging threshold, the charging threshold comprising a threshold level for supplying electrical power to the energy storage system, and setting the first power level-LCL equal to the available storage power capacity; wherein determining the first power level command for the first hybrid-electric powertrain comprises limiting the first power level command by the first power level-UCL and the first power level-LCL.

The method of any preceding clause, wherein: determining the first power level-UCL comprises: determining a first apportionate discharge power capacity, the first apportionate discharge power capacity comprising a first apportionment of the power discharge threshold to first the hybrid-electric powertrain, and setting the first power level-UCL equal to the available discharge power capacity comprises: setting the first power level-UCL equal to the larger of (i) the available discharge power capacity and (ii) the first apportionate discharge power capacity; and/or determining the first power level-LCL comprises: determining a first apportionate storage power capacity, the first apportionate storage power capacity comprising a first apportionment of the charging threshold to the first hybrid-electric powertrain, and setting the first power level-LCL equal to the first available storage power capacity comprises: setting the first power level-LCL equal to the lesser of (i) the available storage power capacity and (ii) the first apportionate storage power capacity.

The method of any preceding clause, comprising: determining a second power level-UCL and a second power level-LCL for a second hybrid-electric powertrain, the second hybrid-electric powertrain electrically coupled to an energy storage system; and determining a second power level command for the second hybrid-electric powertrain, the second power level command determined based at least in part on the second power level-UCL and the second power level-LCL; wherein determining the second power level-UCL comprises: determining a second available discharge power capacity at least in part by subtracting (i) a second aggregate obverse power level request from (ii) a power discharge threshold, the second aggregate obverse power level request comprising a second requested power level for one or more second obverse hybrid-electric powertrains electrically coupled to the energy storage system, and the power discharge threshold comprising a threshold level for discharging electrical power from the energy storage system, and setting the second power level-UCL equal to the available discharge power capacity; wherein determining the second power level-LCL comprises: determining a second available storage power capacity at least in part by subtracting (i) the second aggregate obverse power level request from (ii) the charging threshold, the charging threshold comprising a threshold level for supplying electrical power to the energy storage system, and setting the second power level-LCL equal to the available storage power capacity; wherein determining the second power level command for the second hybrid-electric powertrain comprises limiting the second power level command by the second power level-UCL and the second power level-LCL.

The method of any preceding clause, wherein: determining the second power level-UCL comprises: determining a second apportionate discharge power capacity, the second apportionate discharge power capacity comprising a second apportionment of the power discharge threshold to second the hybrid-electric powertrain, and setting the second power level-UCL equal to the available discharge power capacity comprises: setting the second power level-UCL equal to the larger of (i) the available discharge power capacity and (ii) the second apportionate discharge power capacity; and/or determining the second power level-LCL comprises: determining a second apportionate storage power capacity, the second apportionate storage power capacity comprising a second apportionment of the charging threshold to the second hybrid-electric powertrain, and setting the second power level-LCL equal to the second available storage power capacity comprises: setting the second power level-LCL equal to the lesser of (i) the available storage power capacity and (ii) the second apportionate storage power capacity.

The method of any preceding clause, wherein: the one or more first obverse hybrid-electric powertrains comprises the second hybrid-electric powertrain, and wherein the first requested power level is for the second hybrid-electric powertrain; and/or the one or more second obverse hybrid-electric powertrains comprises the first hybrid-electric powertrain, and wherein the second requested power level is for the first hybrid-electric powertrain.

The method of any preceding clause, wherein: limiting the first power level command by the first power level-UCL and the first power level-LCL comprises: setting the first power level command equal to a first power level request for the first hybrid-electric powertrain when the first power level request is between the first power level-UCL and the first power level-LCL; and/or limiting the second power level command by the second power level-UCL and the second power level-LCL comprises: setting the second power level command equal to a second power level request for the second hybrid-electric powertrain when the second power level request is between the second power level-UCL and the second power level-LCL.

The method of any preceding clause, wherein: limiting the first power level command by the first power level-UCL and the first power level-LCL comprises: setting the first power level command equal to the first power level-UCL when the first power level request is greater than the first power level-UCL, and setting the first power level command equal to the first power level-LCL when the first power level request is less than the first power level-LCL; and/or limiting the second power level command by the second power level-UCL and the second power level-LCL comprises: setting the second power level command equal to the second power level-UCL when the second power level request is greater than the second power level-UCL, and setting the second power level command equal to the second power level-LCL when the second power level request is less than the second power level-LCL.

The method of any preceding clause, comprising: receiving at a first electronic controller, (i) a first power level request for the first hybrid-electric powertrain, and (ii) the first aggregate obverse power level request and/or the first requested power level for the one or more first obverse hybrid-electric powertrains, the first electronic controller incorporated into and/or communicatively coupled with a first power control unit for the first hybrid-electric powertrain; and/or receiving at a second electronic controller, (i) a second power level request for the second hybrid-electric powertrain, and (ii) the second aggregate obverse power level request and/or the second requested power level for the one or more second obverse hybrid-electric powertrains, the second electronic controller incorporated into and/or communicatively coupled with a second power control unit for the second hybrid-electric powertrain.

The method of any preceding clause, comprising: providing the first power level command to one or more first power management devices, the one or more first power management devices defining at least a portion of the first power control unit for the first hybrid-electric powertrain; and/or providing the second power level command to one or more second power management devices, the one or more second power management devices defining at least a portion of the second power control unit for the second hybrid-electric powertrain.

The method of any preceding clause, wherein the method comprises: generating electrical power and/or converting electrical power to mechanical power with the first hybrid-electric powertrain based at least in part on the first power level command to the one or more first power management devices; and/or generating electrical power and/or converting electrical power to mechanical power with the second hybrid-electric powertrain based at least in part on the second power level command to the one or more second power management devices.

The method of any preceding clause, wherein method comprises: generating mechanical power with the first hybrid-electric powertrain based at least in part on the first power level command to the one or more first power management devices, and providing the mechanical power to one or more first propulsors; and/or generating mechanical power with the second hybrid-electric powertrain based at least in part on the second power level command to the one or more second power management devices, and providing the mechanical power to one or more second propulsors.

The method of any preceding clause, wherein method comprises: providing electrical power from the first hybrid-electric powertrain to the energy storage system based at least in part on the first power level command to the one or more first power management devices; and/or providing electrical power from the second hybrid-electric powertrain to the energy storage system based at least in part on the second power level command to the one or more second power management devices.

The method of any preceding clause, wherein method comprises: receiving electrical power from the energy storage system at the first hybrid-electric powertrain based at least in part on the first power level command to the one or more first power management devices; and/or receiving electrical power from the energy storage system at the second hybrid-electric powertrain based at least in part on the second power level command to the one or more second power management devices.

The method of any preceding clause, wherein method comprises: receiving electrical power from the second hybrid-electric powertrain at the first hybrid-electric powertrain based at least in part on the first power level command to the one or more first power management devices; and/or receiving electrical power from the first hybrid-electric powertrain at the second hybrid-electric powertrain based at least in part on the second power level command to the one or more second power management devices.

The method of any preceding clause, wherein: the first hybrid-electric powertrain comprises: a first combustion engine, a first electric machine, one or more first propulsors, and the first power control unit, wherein the one or more first propulsors are mechanically coupled with the first electric machine and/or the first combustion engine, wherein the first power control unit is electrically coupled with the first electric machine; and/or the second hybrid-electric powertrain comprises: a second combustion engine, a second electric machine, one or more first propulsors, and the second power control unit, wherein the one or more second propulsors are mechanically coupled with the second electric machine and/or the second combustion engine, wherein the second power control unit is electrically coupled with the second electric machine.

The method of controlling a hybrid-electric or all-electric propulsion system of any preceding clause, wherein the method includes the method of controlling a hybrid-electric powertrain of any preceding clause.

The method of any preceding clause, wherein the method is performed using The hybrid-electric or all-electric propulsion system and/or the hybrid-electric powertrain of any preceding clause.

A non-transitory computer-readable medium comprising computer-executable instructions, which when executed by a processor associated with an electronic controller for a hybrid-electric or all-electric powertrain for an aircraft, cause the electronic controller to perform a method comprising: determining a power level-upper control limit (power level-UCL) for a hybrid-electric powertrain, the hybrid-electric powertrain electrically coupled to an energy storage system; and determining a power level command for the hybrid-electric powertrain, the power level command determined based at least in part on the power level-UCL; wherein the power level-UCL corresponds to a difference between an aggregate obverse power level request and a power discharge threshold; and wherein determining the power level command for the hybrid-electric powertrain comprises limiting the power level command by the power level-UCL.

The non-transitory computer-readable medium comprising computer-executable instructions, which when executed by a processor associated with an electronic controller for a hybrid-electric powertrain for an aircraft, cause the electronic controller to perform the method of any preceding clause.

This written description uses examples to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. The scope of the claims encompasses such other examples that include structural elements that do not differ from the literal language of the claims or that have insubstantial differences from the literal languages of the claims.

What is claimed is:

1. A powertrain for an aircraft, the powertrain comprising:
an electric machine;
an energy storage system; and
a power control unit, the power control unit electrically coupling the electric machine to the energy storage system;
wherein the power control unit comprises an electronic controller, the electronic controller comprising a non-transitory computer-readable medium comprising computer-executable instructions, which when executed by a processor associated with the electronic controller, cause the power control unit to perform a method comprising:
determining a power level-upper control limit (power level-UCL) for the powertrain, wherein the power level-UCL corresponds to a difference between an aggregate obverse power level request and a power discharge threshold;
determining a power level-lower control limit (power level-LCL) for the powertrain by determining an available storage power capacity, the available storage power capacity comprising a difference resulting from subtracting (i) the aggregate obverse power level request from (ii) a charging threshold, the charging threshold comprising a threshold level for supplying electrical power to the energy storage system; and
determining a power level command for the powertrain, the power level command determined based at least in part on one of the power level-UCL or the power level-LCL, wherein determining the power level command for the powertrain comprises limiting the power level command by the one of the power level-UCL or the power level-LCL.

2. The powertrain of claim 1, wherein determining the power level-UCL comprises:
determining an available discharge power capacity, the available discharge power capacity comprising a difference resulting from subtracting (i) the aggregate obverse power level request from (ii) the power discharge threshold, the aggregate obverse power level request comprising a requested power level for one or more obverse powertrains electrically coupled to the energy storage system, and the power discharge threshold comprising a threshold level for discharging electrical power from the energy storage system; and
setting the power level-UCL equal to the available discharge power capacity.

3. The powertrain of claim 2, wherein the powertrain, the one or more obverse powertrains, and the energy storage system are electrically coupled to a distribution bus.

4. The powertrain of claim 2, wherein the requested power level for the one or more obverse powertrains is provided by an input apparatus, the input apparatus comprising at least one of: a thrust lever, a power lever, or an automatic throttle system.

5. The powertrain of claim 1, wherein the powertrain comprises a series configuration, a parallel configuration, or a series-parallel configuration.

6. The powertrain of claim 1, comprising:
a combustion engine; and
one or more propulsors configured to receive mechanical power from the combustion engine and the electric machine, individually or simultaneously.

7. The powertrain of claim 1, wherein the power control unit comprises one or more power management devices, the one or more power management devices comprising at least one of: an inverter, a converter, a rectifier, a synchronous converter, a synchronous buck converter, a bidirectional interleave converter, an autotransformer rectifier, or a matrix converter.

8. A method of controlling a powertrain of an aircraft, the method comprising:
determining a power level-upper control limit (power level-UCL) for the powertrain, the powertrain electrically coupled to an energy storage system;
determining a power level-lower control limit (power level-LCL) for the powertrain by determining an available storage power capacity, the available storage power capacity comprising a difference resulting from subtracting (i) an aggregate obverse power level request from (ii) a charging threshold, the charging threshold comprising a threshold level for supplying electrical power to the energy storage system; and
determining a power level command for the powertrain, the power level command determined based at least in part on one of the power level-UCL or the power level-LCL;
wherein the power level-UCL corresponds to a difference between the aggregate obverse power level request and a power discharge threshold; and
wherein determining the power level command for the powertrain comprises limiting the power level command by the one of the power level-UCL or the power level-LCL.

9. The method of claim 8, wherein limiting the power level command by the one of the power level-UCL or the power level-LCL comprises at least one of:
setting the power level command equal to the power level-UCL when a power level request for the powertrain is greater than the power level-UCL; or setting the power level command equal to the power level request when the power level request is between the power level-UCL and the power level-LCL, and setting the power level command equal to the power level-LCL when the power level request is less than the power level-LCL.

10. The method of claim 8, wherein determining the power level-UCL comprises:

determining an available discharge power capacity, the available discharge power capacity comprising a difference resulting from subtracting (i) the aggregate obverse power level request from (ii) the power discharge threshold, the aggregate obverse power level request comprising a requested power level for one or more obverse powertrains electrically coupled to the energy storage system, and the power discharge threshold comprising a threshold level for discharging electrical power from the energy storage system; and setting the power level-UCL.

11. The method of claim 10, comprising:

receiving at an electronic controller, an additional power level request for the powertrain, the electronic controller at least one of incorporated into or communicatively coupled with a power control unit for the powertrain.

12. The method of claim 11, comprising:

receiving, at the electronic controller, at least one of the aggregate obverse power level request or the additional power level request for the one or more obverse powertrains.

13. The method of claim 11, comprising:

providing the power level command to one or more power management devices, the one or more power management devices defining at least a portion of the power control unit for the powertrain.

14. The method of claim 10, wherein determining the power level-UCL comprises:

determining an apportionate discharge power capacity, the apportionate discharge power capacity comprising an apportionment of the power discharge threshold to the powertrain;

wherein setting the power level-UCL comprises:

setting the power level-UCL equal to either (i) the available discharge power capacity or (ii) the apportionate discharge power capacity.

15. The method of claim 14, comprising:

setting the power level-UCL equal to either (i) the available discharge power capacity or (ii) the apportionate discharge power capacity using a capacity level operator.

16. The method of claim 14, wherein the apportionment of the power discharge threshold to the powertrain comprises applying an apportionment factor to the power discharge threshold.

17. The method of claim 8, comprising:

setting the power level-LCL;

wherein determining the power level command for the powertrain comprises limiting the power level command by the power level-LCL.

18. The method of claim 17, wherein determining the power level-LCL comprises:

determining an apportionate storage power capacity, the apportionate storage power capacity comprising an apportionment of the charging threshold to the powertrain;

wherein setting the power level-LCL equal to the available storage power capacity comprises:

setting the power level-LCL equal to either (i) the available storage power capacity or (ii) the apportionate storage power capacity.

19. The method of claim 18, comprising:

setting the power level-LCL equal to either (i) the available storage power capacity or (ii) the apportionate storage power capacity using a capacity level operator.

20. A non-transitory computer-readable medium comprising computer-executable instructions, which when executed by a processor associated with an electronic controller for a powertrain for an aircraft, cause the electronic controller to perform a method comprising:

determining a power level-upper control limit (power level-UCL) for the powertrain, the powertrain electrically coupled to an energy storage system;

determining a power level-lower control limit (power level-LCL) for the powertrain by determining an available storage power capacity, the available storage power capacity comprising a difference resulting from subtracting (i) an aggregate obverse power level request from (ii) a charging threshold, the charging threshold comprising a threshold level for supplying electrical power to the energy storage system; and determining a power level command for the powertrain, the power level command determined based at least in part on one of the power level-UCL or the power level-LCL;

wherein the power level-UCL corresponds to a difference between the aggregate obverse power level request and a power discharge threshold; and wherein determining the power level command for the powertrain comprises limiting the power level command by the one of the power level-UCL or the power level-LCL.

* * * * *